US006788831B1

(12) United States Patent
Nabeshima

(10) Patent No.: US 6,788,831 B1
(45) Date of Patent: *Sep. 7, 2004

(54) IMAGE READING APPARATUS

(75) Inventor: Takayuki Nabeshima, Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 769 days.

(21) Appl. No.: 09/233,983

(22) Filed: Jan. 19, 1999

(30) Foreign Application Priority Data

Jan. 19, 1998 (JP) .......................................... P10-007319

(51) Int. Cl.⁷ .......................... H04N 1/028; H01J 40/14
(52) U.S. Cl. ....................... 382/312; 358/482; 358/483; 358/475; 358/513; 358/514; 358/509
(58) Field of Search ................................ 382/312, 274, 382/315, 317, 318, 319; 358/298, 483, 482, 475, 514, 513, 504, 509, 406, 474; 250/208.1; 356/3.06, 3.07, 3.08, 3.11, 3.12, 3.13, 4.01–4.09, 5.01–5.09, 338, 343, 213, 218

(56) References Cited

U.S. PATENT DOCUMENTS

| | | | | |
|---|---|---|---|---|
| 4,377,742 A | * | 3/1983 | Kawabata et al. | 250/204 |
| 4,470,676 A | * | 9/1984 | Kinoshita et al. | 396/147 |
| 4,888,492 A | * | 12/1989 | Arimoto | 382/274 |
| 5,281,800 A | * | 1/1994 | Pelton et al. | 235/462 |
| 5,371,567 A | * | 12/1994 | Ishida et al. | 396/275 |
| 5,581,089 A | * | 12/1996 | Kohno | 250/459.1 |
| 5,798,842 A | * | 8/1998 | Yamazaki | 358/298 |

FOREIGN PATENT DOCUMENTS

JP          09307750          11/1997

* cited by examiner

Primary Examiner—King Y. Poon
(74) Attorney, Agent, or Firm—Sidley Austin Brown & Wood LLP

(57) ABSTRACT

An image reading apparatus capable of taking full advantage of each device function and adjusting it even if each device function varies depending on respective machines. The image reading apparatus includes an illumination unit directing light toward an original document, a transducer unit transducing the light directed toward the original document and reflected therefrom to an electric signal, and a controller controlling the amount of light from the illumination unit according to a saturation characteristic and a frequency characteristic of the transducer unit.

19 Claims, 27 Drawing Sheets

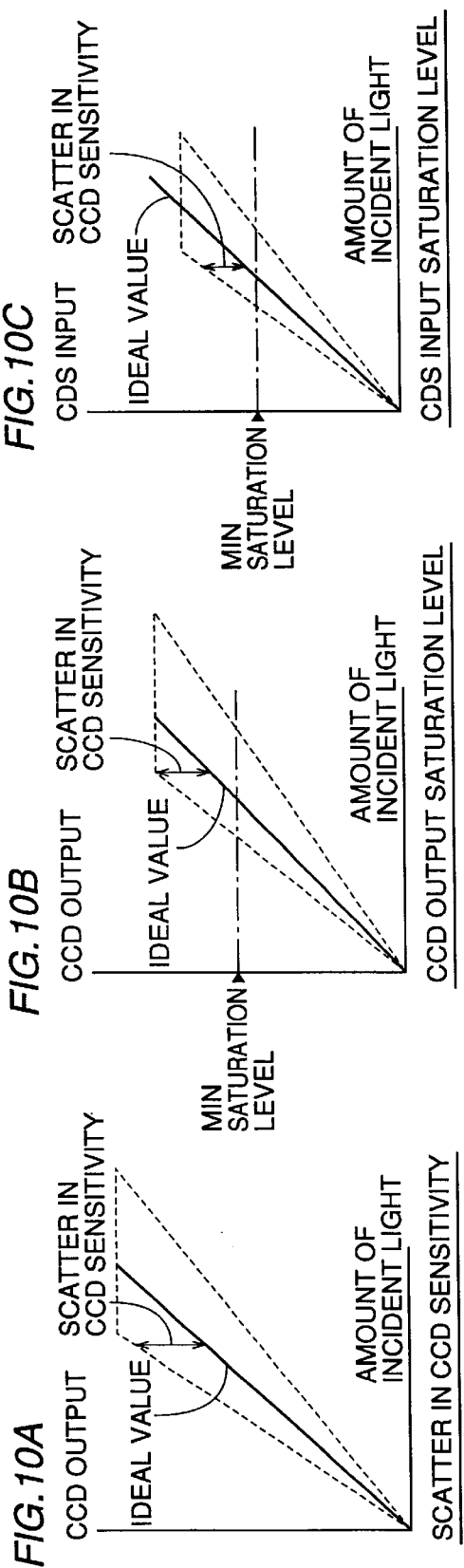
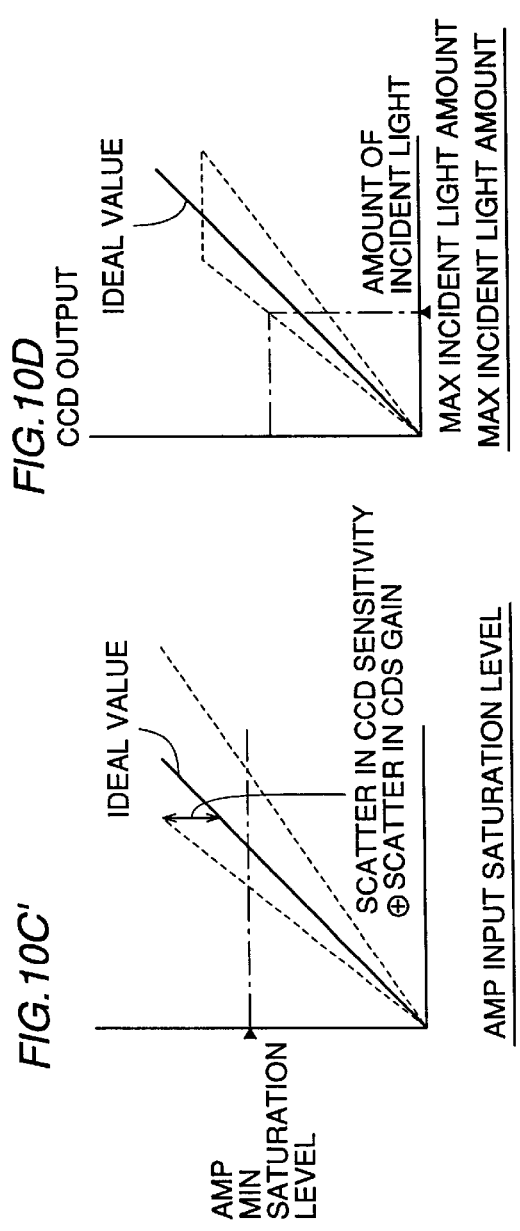
FIG.10A, FIG.10B, FIG.10C, FIG.10C', FIG.10D

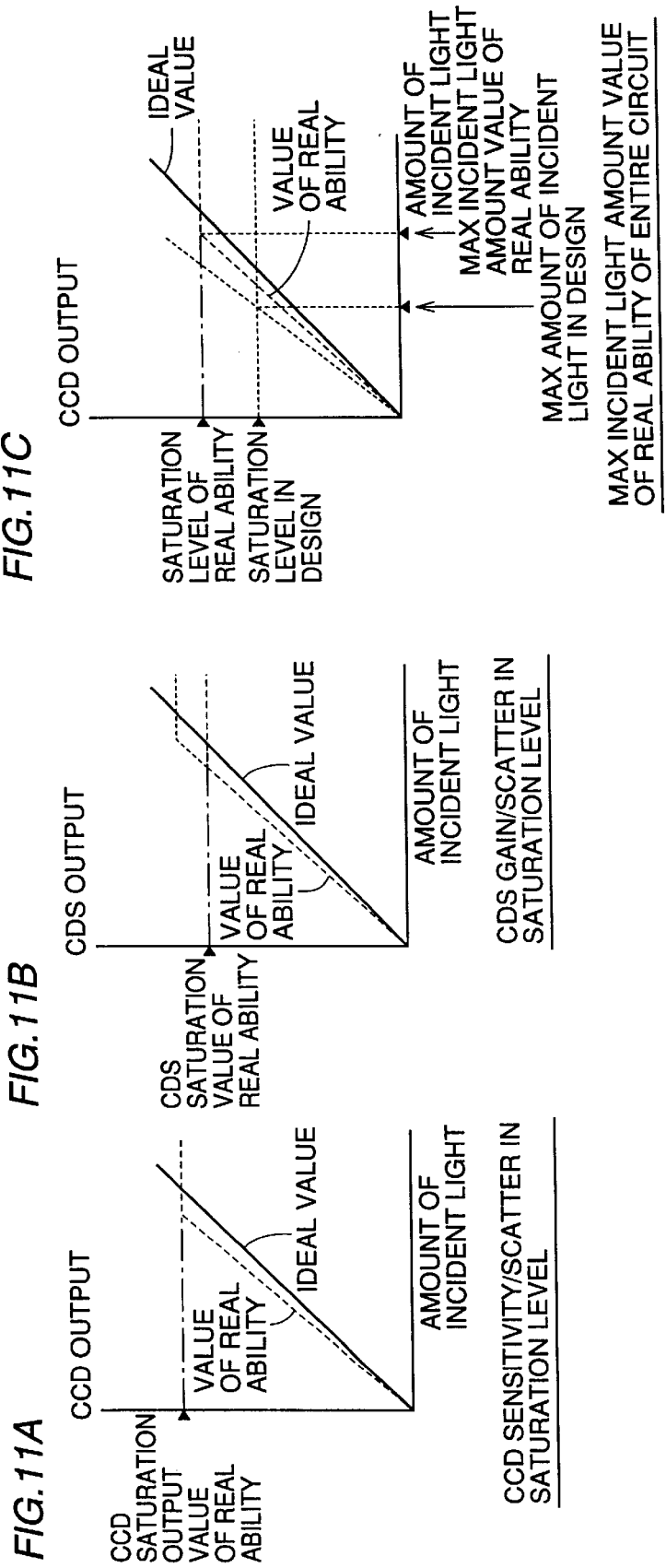

CCD INCIDENT LIGHT AMOUNT

CCD OUTPUT VOLTAGE

CDS OUTPUT VOLTAGE

READABLE LEVEL

GRAY SCALE

RELATION BETWEEN SLEW RATE AND SIGNAL LEVEL ①

▲ SAMPLING POINT

RELATION BETWEEN SLEW RATE AND SIGNAL LEVEL ②

FIG.20A PRIOR ART
GRAY SCALE
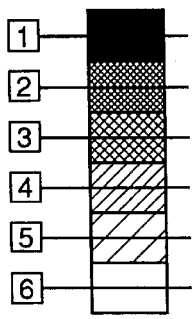
FIG.20B PRIOR ART
RELATION BETWEEN SLEW RATE AND SIGNAL LEVEL ①
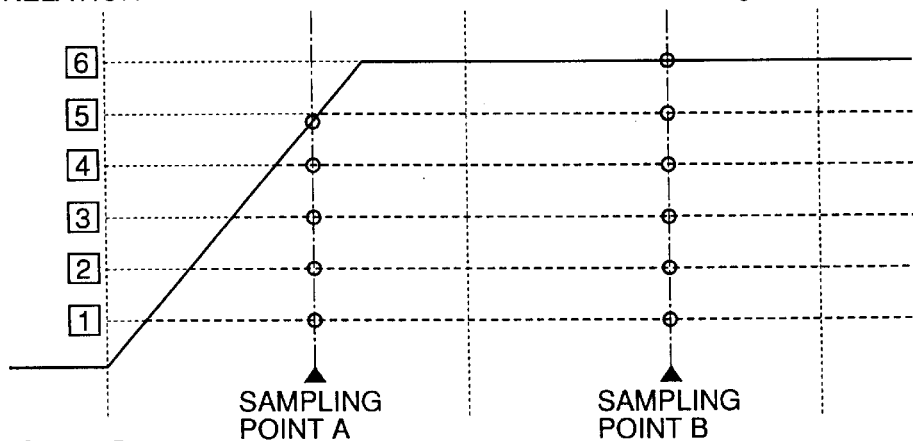
FIG.20C PRIOR ART
RELATION BETWEEN SLEW RATE AND SIGNAL LEVEL ②
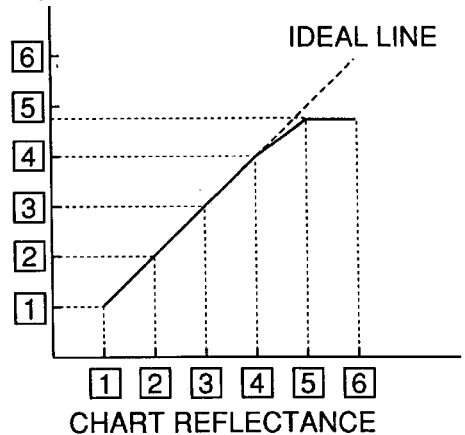
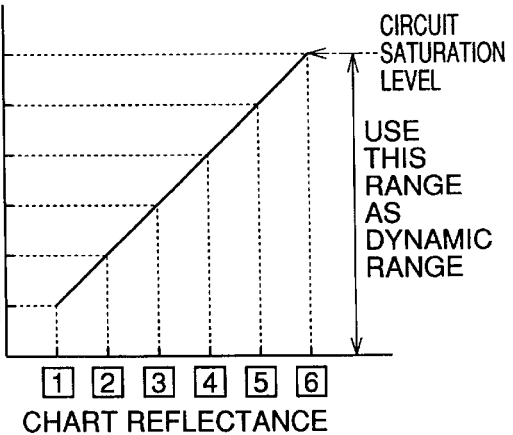

IMAGE READING APPARATUS

This application is based on application No. 10-007319 filed in Japan, the contents of which is hereby incorporated by reference.

BACKGROUND OF THE INVENTION

1. Field of the Invention

The present invention relates to an image reading apparatus, and particularly to an image reading apparatus used for a digital copying machine and the like.

2. Description of the Background Art

According to one method of controlling the amount of light received by a photoelectric transducer section in a conventional image reading apparatus, the level of the amount of light illuminating an original document is preliminarily defined under the worst condition in system design. According to another method, the circuit gain is measured in advance by a substrate checker, and the measurement is fed back to the level of the amount of light illuminating the original document.

According to the method of preliminarily defining the level under the worst condition in system design and any conventional method of controlling the amount of light received by the photoelectric transducer section, there is scatter in gain and the like in each circuit, and a final A/D output value includes the scatter of each circuit. In the case of the method of preliminarily defining the A/D out under the worst condition in system design, the circuit never saturates on any condition. However, there is actually a considerable margin between the saturation level and the defined level because of the scatter in each circuit, resulting in unnecessary decrease in the quality of an image.

In the case of the method of measuring the circuit gain by the substrate checker, improvement relative to the scatter of the gain of each circuit is achieved. However, the scatter of the input/output saturation level of each device is not considered yet. In addition, although measurement of the circuit gain (and input/output saturation level in some cases) by the substrate checker or the like is effective, the cost of assembly would increase and the measurement would be required again when components are replaced.

SUMMARY OF THE INVENTION

An object of the present invention is to provide an image reading apparatus capable of taking full advantage of each device function and adjusting it even if each device function varies depending on respective machines.

According to one aspect of the present invention, an image reading apparatus is provided. The image reading apparatus includes an illumination unit directing light toward an original document, a transducer unit transducing the light directed toward the original document and reflected therefrom to an electric signal, and a controller controlling the amount of light from the illumination unit according to a saturation characteristic and a frequency characteristic of the transducer unit.

According to another aspect of the present invention, an image reading apparatus is provided. The image reading apparatus includes an illumination unit directing light toward an original document, a transducer unit transducing the light directed toward the original document and reflected therefrom to an electric signal, a change unit changing time for accumulating an amount of light at the transducer unit, and a controller controlling the time for accumulating an amount of light at the change unit according to a saturation characteristic and a frequency characteristic of the transducer unit.

Preferably, a detector detecting the saturation characteristic and the frequency characteristic of the transducer unit may be provided.

The detector can detect the saturation and frequency characteristics of the transducer unit by, for example, reading a pattern.

The pattern may have change in density in, as one example, a sub scanning direction.

The change in density in the sub scanning direction may be arranged to allow the density to gradually decrease.

The pattern may have change in density in, as another example, a main scanning direction.

Two degrees of the density may be alternately arranged, for example, to constitute the change in density in the main scanning direction.

According to the present invention, an actual machine can be manufactured taking full advantage of each device characteristic for combining respective devices. Consequently, enhancement in image quality is achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 10A–10D are provided for describing a concept of how to determine the amount of CCD-received light according to the conventional concept of the circuit saturation level determination.

FIGS. 11A–11C are provided for describing a concept of how to determine the amount of light incident on the CCD according to the present invention.

FIGS. 20A–20C are provided for describing detection of the saturation level based on the solid gray scale.

FIG. 23 shows a flow chart illustrating one example of an operation sequence followed when the power source is turned on.

FIG. 30 shows a flow chart illustrating another example of the operation sequence followed when the power source is turned on.

DESCRIPTION OF THE PREFERRED EMBODIMENTS

One example of the embodiments of the present invention is hereinafter described in conjunction with drawings.

Figure 1:
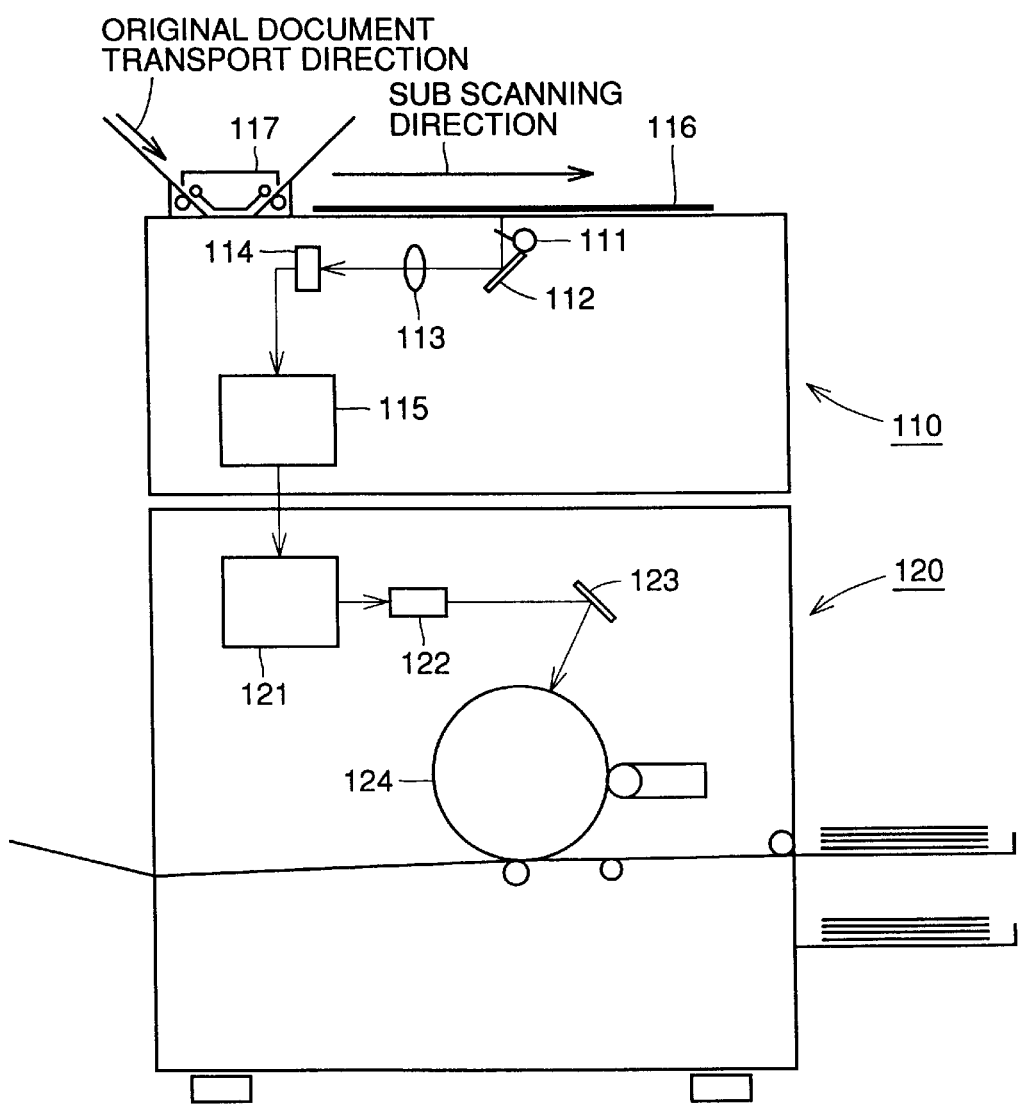
FIG. 1 illustrates a structure of one example of a digital copying machine employing an image reading apparatus according to the present invention.

FIG. 1 shows a structure of one example of a digital copying machine employing an image reading apparatus according to the present invention.

Referring to FIG. 1, the digital copying machine is constituted of an upper image reading apparatus 110 and a lower image recording apparatus 120, and image reading apparatus 110 is further constituted of a platen glass 116 and a successive feeding and copying unit 117.

In image reading apparatus 110, light is directed from a light source 111 onto an original document using a reduction optical system, and the reflected light from the surface of the original document forms an image on a linear CCD 114 through a mirror 112 and a lens 113, providing a photoelectrically converted analog electric signal. The resolution of the CCD is 400 dpi, and the maximum size of the original document is A3 (about 5000 DOT per one line).

The analog electric signal is converted to digital data in an image processing unit 115, image processing such as variable scale magnification and image quality correction is applied, and the digital data are output from image reading apparatus 110.

A scanning direction of linear CCD 114 is defined as a main scanning direction, and a direction perpendicular to the main scanning direction is defined as a sub scanning direction. If an original document is manually set, the original document is scanned in the main scanning direction by CCD 114, and scanned in the sub scanning direction by horizontal shift of the mirror. If original documents are fed and copied successively, an original document is scanned in the main scanning direction by CCD 114, and the original document is transported to be scanned in the sub scanning direction. Accordingly, image signals are successively transferred line by one line in the main scanning.

In image recording apparatus 120, the digital image data supplied from image reading apparatus 110 are converted to an analog electric signal by a laser diode drive unit 121, and further converted to light by a laser beam source 122 to be imaged on a photoreceptor drum 124 via a polygon mirror 123. The image on photoreceptor drum 124 is reproduced as an image of 400 dpi and 256 gradations according to the electrophotographic system by controlling current supplied to laser beam source 122 pixel by pixel, and thus controlling the amount of light in order to control the amount of toner to be attached.

Figure 2:
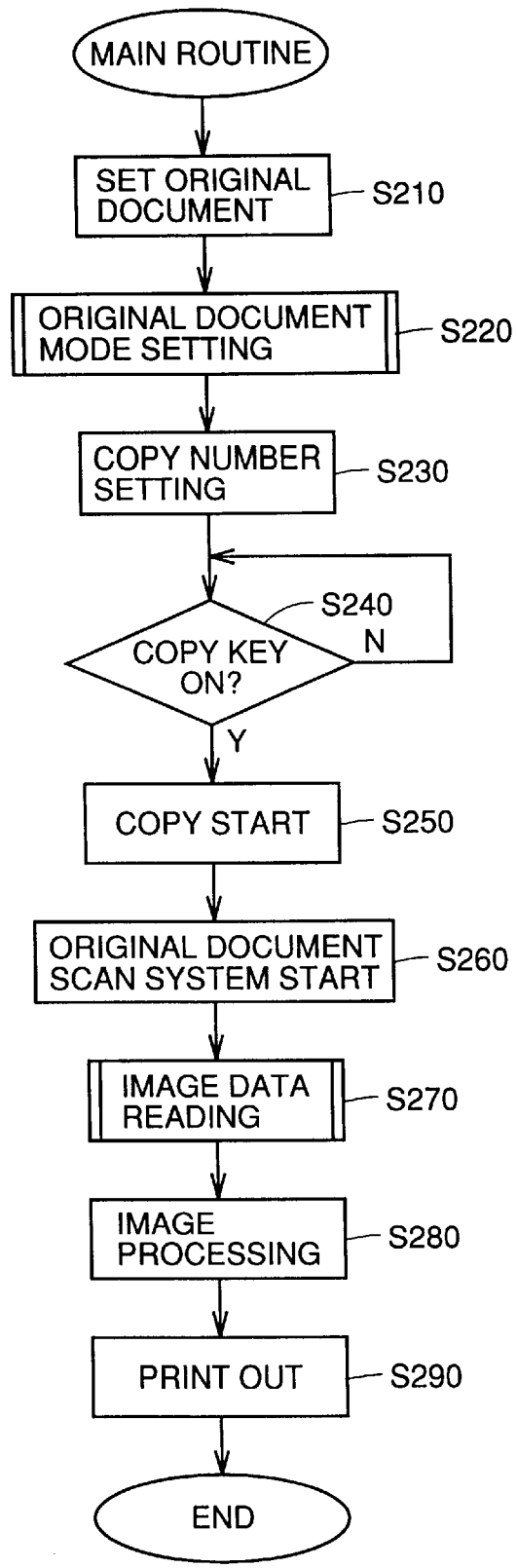
FIG. 2 shows a flow chart illustrating an operation of one example of a copying machine having a general mode switch function.

FIG. 2 is a flow chart illustrating an operation of one copying machine having a general mode switching function.

Referring to FIG. 2, an original document is first set on a platen (S210), and an original document mode is set (S220). Specifically, if an original document to be copied is a photographic one, "photo mode" is set, and if an original document has characters, "character mode" is set.

The number of copies to be made is next set (S230). Other conditions such as sheet, density of the original document and the like are automatically set by the copying machine, and those are set manually if necessary.

After the above setting is completed, a copy start key is pressed (S240) to start a copying operation (S250). An original document scan system is accordingly started (S260), image data are read while the original document is scanned (S270), and image processing is applied to the read image data in an image processing circuit (S280). The image-processed data thus obtained are supplied to an image output unit, and the original document is accordingly printed out (S290).

Figure 3:
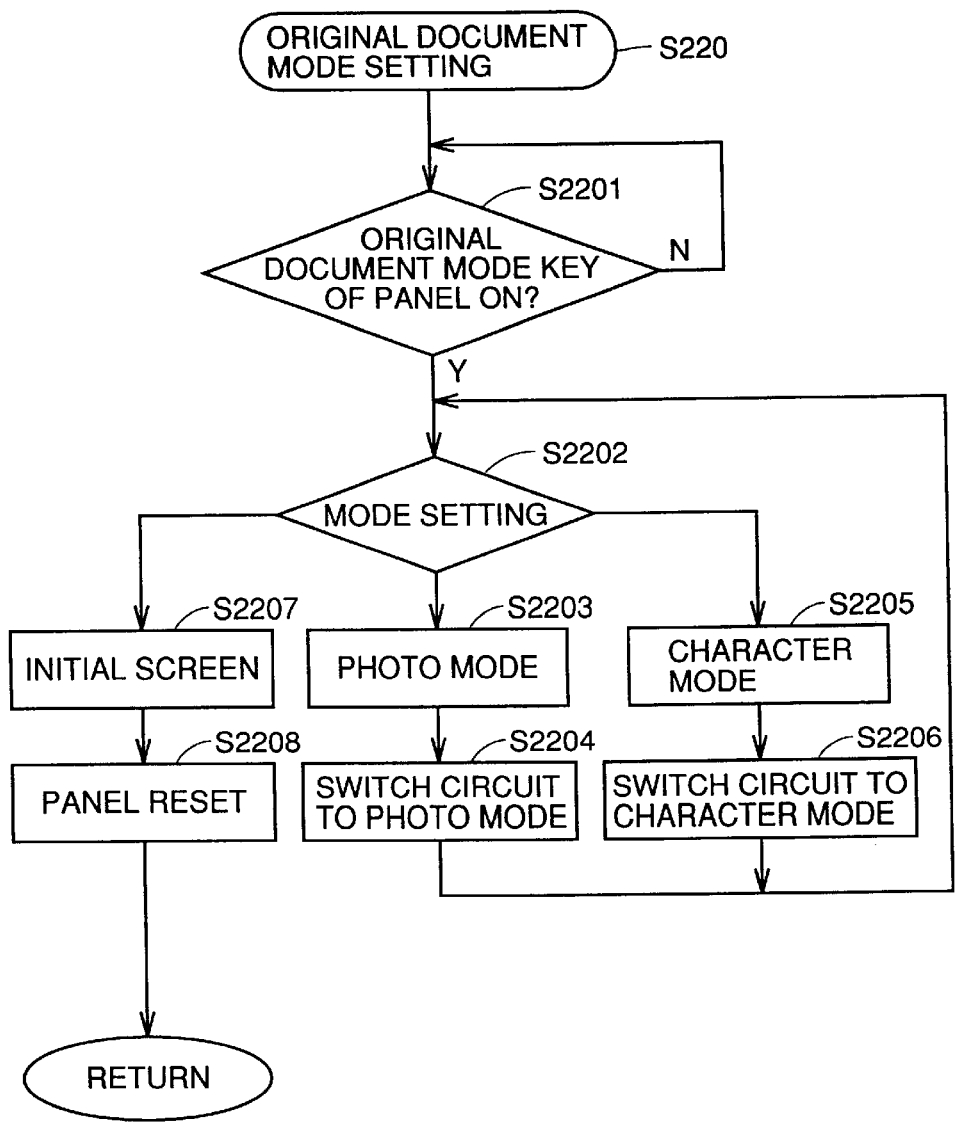
FIG. 3 shows a flow chart illustrating an operation concerned with setting of an original document mode which is one of the subroutines in the main routine shown in FIG. 2.

FIG. 3 is a flow chart illustrating an operation related to setting of the original document mode that is one of the subroutines of the main routine shown in FIG. 2.

Referring to FIG. 3, whether an original document mode switch key on a panel is pressed or not is determined (S2201).

If the original document mode switch key is pressed, a panel screen shown in FIG. 5 described below is displayed. According to the type of the original document, a "photo" select key 406 or a "character" select key 407 is pressed to set the original document mode (S2202).

If the "photo" select key is pressed, a photo mode is selected (S2203) and the circuit is switched to the photo mode (S2204). If the "character" select key is pressed, the character mode is selected (S2205), and the circuit is switched to the character mode (S2206).

Figure 5:
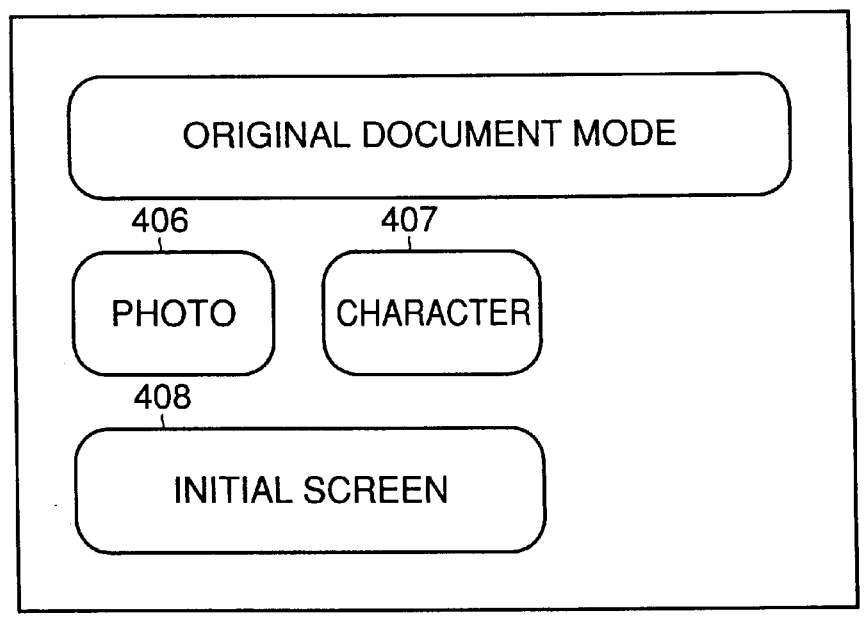
FIG. 5 illustrates a panel screen switched to the original document mode.

After the original document mode is set, an "initial screen" key on the panel screen shown in FIG. 5 is pressed to return the screen to the initial screen (S2207), and accordingly the panel is reset (S2208).

Figure 4:
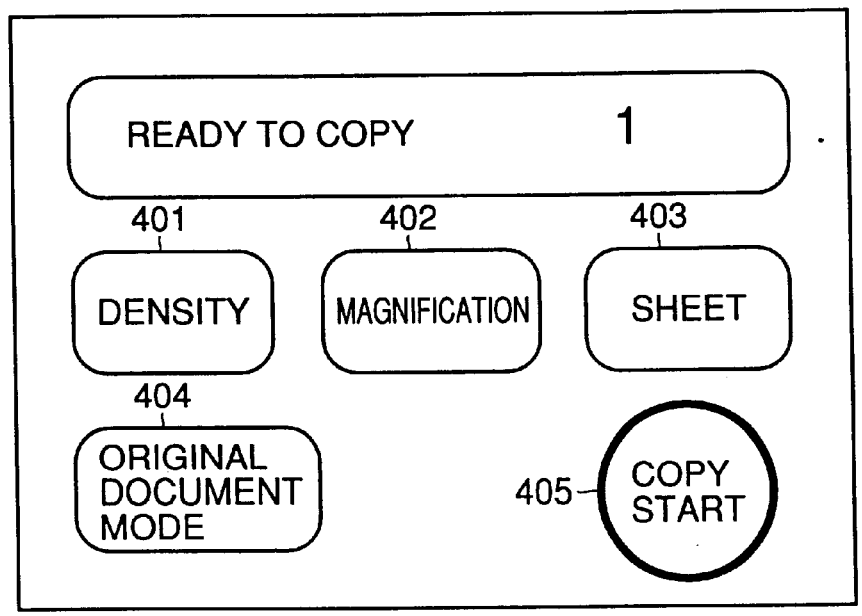
FIG. 4 illustrates a panel screen for setting the original mode in the copying machine.

FIG. 4 illustrates a panel screen for setting the original document mode in the copying machine.

Referring to FIG. 4, when an original document is to be copied, the original document is set on the platen, the density of the original document, magnification, and the size of the original document are respectively set by using an original document density set key 401, a magnification set key 402, an original document size set key 403 and the like on the panel, and accordingly the original document mode is switched depending on the type of the original document that is either the photo original document or the character original document. Switching of the original document mode is done after the panel screen is changed by pressing an original document mode switch key 404 on the panel as described below.

FIG. 5 illustrates a panel screen switched to an original document mode.

Referring to FIG. 5, after the panel screen is changed to the original document mode, either "photo" select key 406 or "character" select key" 407 is selected according to the type of the original document for setting the original document mode. After that, "initial screen" key 408 is pressed, and the initial screen shown in FIG. 4 is displayed on the panel. After the number of copies to be made is set by a ten key (not shown), a copy start key 405 is pressed for starting the copying operation.

Figure 6:
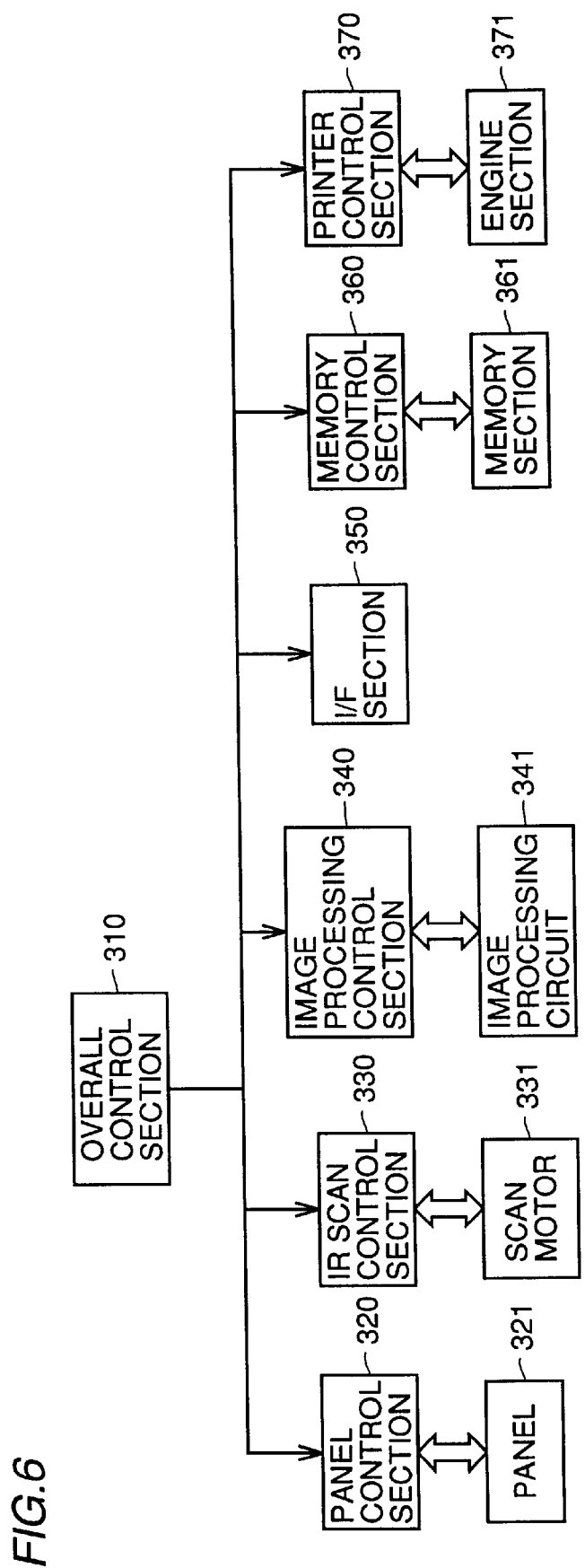
FIG. 6 is a block diagram of the overall control of the copying machine.

FIG. 6 is a block diagram of the overall control of this copying machine.

Referring to FIG. 6, a panel control section 320 controls a panel 321, that is, performs signal processing operation at an interface for panel display and key input described above.

An IR scan control section 330 detects that a copy key of the panel section is pressed, and controls a scan motor 331 to start a scanning operation. While an original document is scanned, an image is read by an instruction from an image processing control section 340, and a prescribed image processing is applied by an image processing circuit 341. Data thus obtained by the image processing are output to any external unit via an I/F section 350, or stored in a memory section 361. A memory control section 360 controls the operation at this time.

Image data thus stored in the memory are transmitted to an engine section 371 for printing according to an instruction from a printer control section 370.

Those operations are controlled by an overall control section 310.

Figure 7:
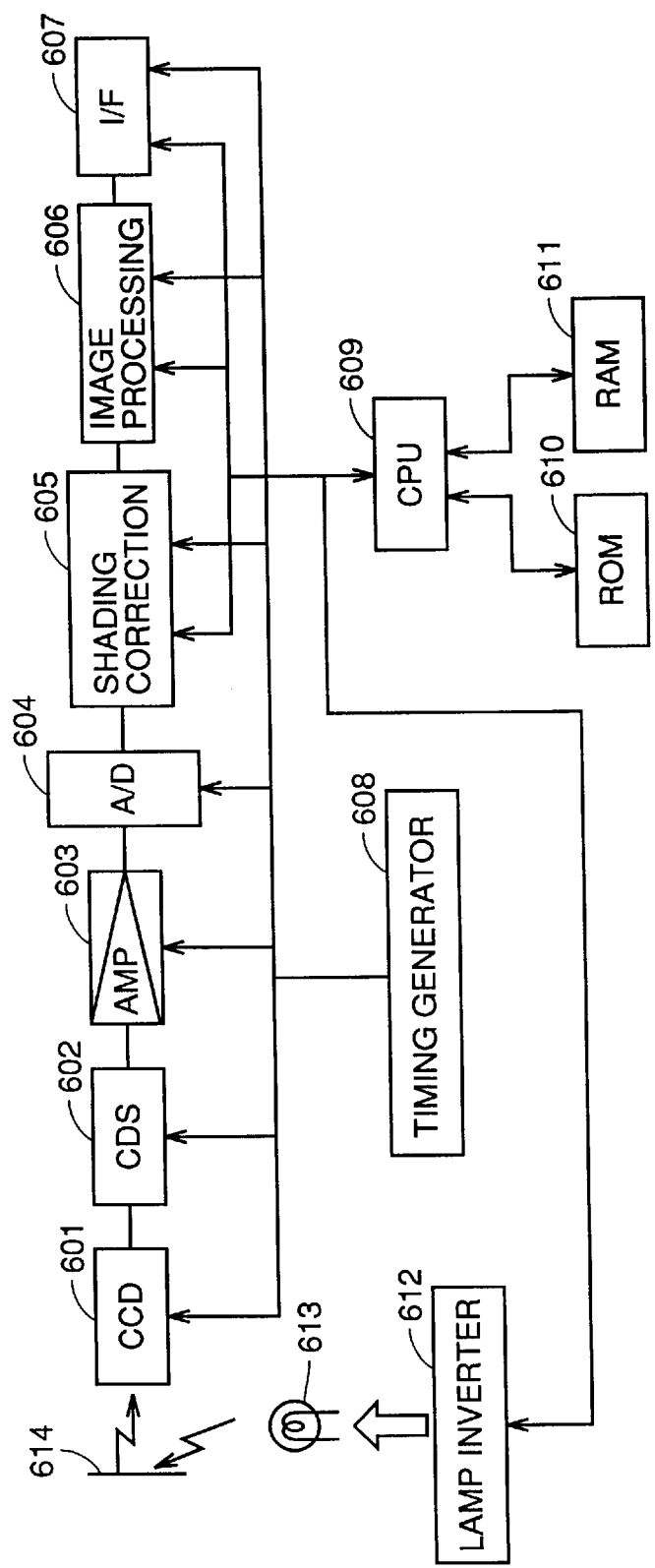
FIG. 7 is a block diagram illustrating an image processing circuit in the image reading apparatus.

FIG. 7 is a block diagram illustrating an image processing circuit of the image reading apparatus.

Referring to FIG. 7, light supplied from an original document illumination source and reflected from an original document is directed to a CCD 601 where photoelectric conversion is applied to the light, and an electric signal according to the amount of light reflected from the original document is output.

At a CDS 602, stable image data of the original document having no low-frequency variable component are output by calculating the difference between sampling data of a precharge portion and a data portion of the CCD output signal. The original document image data output from CDS 602 are amplified to a prescribed dynamic range at a signal amplifier circuit 603, and converted to digital data at an A/D conversion circuit 604.

Shading correction using correction data of a preliminary measured orientation characteristic of the original document illumination source, scatter in CCD pixel sensitivity and the like is applied to the image data converted to the digital data at a shading correction circuit 605, and the corrected data are transmitted to an image processing circuit 606 provided at a subsequent stage. At image processing circuit 606, those processes such as MTF (Modulator Transfer Function) correction, edge emphasis, variable scale magnification, and binarization, and the like are carried out. Image data thus obtained by applying required image processes at image processing circuit 606 are output to a printer section or a memory section via an I/F section 607.

Control of timing for those operations described above is conducted at a timing generator 608, and the timing is also controlled according to an instruction from a CPU 609. A lamp inverter 612 controls an original document illumination lamp 613, and accordingly light is directed to an original document or a gray chart 614. An adjusted lamp luminous intensity is set by CPU 609 at lamp inverter 612.

In this example, the line period of CCD 601 can be changed by timing generator 608 so that an accumulation time of CCD 601 can be controlled. By controlling the accumulation time of CCD 601, the photoelectric transducing level can be controlled even if the same amount of light is directed onto CCD 601.

In FIG. 7, software for controlling the CPU is stored in a ROM 610, and a RAM 611 is used as an area for temporarily storing data that are processed.

Figure 8:
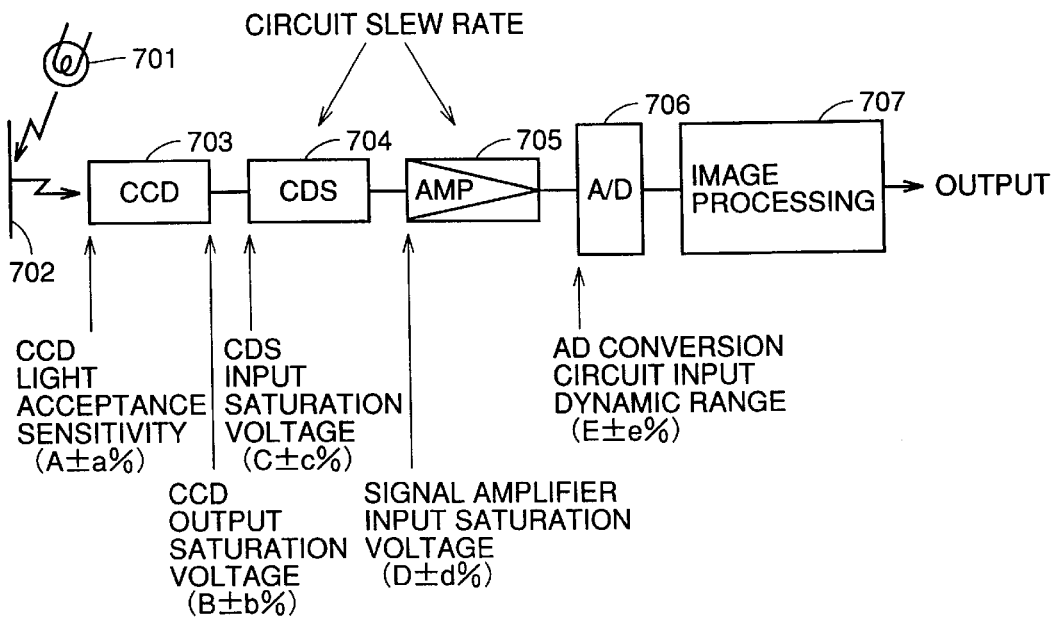
FIG. 8 is provided for describing a conventional concept of how to determine a circuit saturation level.

FIG. 8 is provided for describing a conventional concept of how to determine a circuit saturation level.

Referring to FIG. 8, light supplied from an original document illumination source 701 is reflected from an original document 702 to be directed to CCD 703 through an optical system. At CCD 703, the light is converted to an electric signal according to the amount of incident light and output.

Only the necessary component of the signal output from the CCD is sampled at a CDS 704, amplified to a prescribed dynamic range at a signal amplifier circuit 705, further converted to a digital signal at an A/D conversion circuit 706, and a prescribed image process is applied to the signal at an image processing circuit 707 placed at a following stage. This image processing operation is performed considering any specific deformation of waveform due to the slew rate of each device in an analog circuit such as the CDS and the amplifier that leads to reduction of the gain, and further leads to a difference in gain depending on signal frequency.

At this time, a saturation level of the entire circuit is determined according to various characteristics of respective blocks in the processing circuit. Circuit components are: light acceptance sensitivity of the CCD (A±a%); output saturation voltage of the CCD (B±b%); input saturation voltage of the CDS (C±c%); input saturation voltage of the signal amplifier circuit (D±d%); and input dynamic range of the A/D conversion circuit (E±e%). In order to avoid saturation in any situation, usually the mean square of scattered values of each circuit component is determined and used as the minimum (min) saturation level of the circuit as the system is designed.

Accordingly, in the example of the circuit illustrated in FIG. 8, a "scatter value" (referring to the mean square of scattered values) ΔS of the entire circuit is represented by Equation (1) below.

$$\Delta S = \sqrt{(a^2+b^2+c^2+d^2+e^2)} \tag{1}$$

In order to control the amount of light for the entire system, the maximum amount of light for illuminating an original document is determined considering ±ΔS obtained by Equation (1) above, relative to a design median obtained when the original document with readable density (density of a shading plate or the like) is read. With the system fixed, the range of the CCD output level from $V_{max}$ to $V_{min}$ is determined.

The amount of light and image noise have a relation such as a relation between the amount of incident light and output signal noises illustrated in FIG. 21 and described below. The image noise is proportional to the root of the amount of light illuminating an original document. No problem would arise if there is an enough margin between the required image quality and the amount of light illuminating the original document. However, the higher-image-quality trend of the laser increases the level of the required image quality, and actually the difference between a system-guaranteed minimum (min) light amount and a circuit saturation level is decreasing.

A proposed method for solving such a problem is to precisely control the amount of light incident onto the original document and adjust the amount of light even if the range of an allowable level is small.

According to this method, control of a light source with a large temperature variation such as a hot cathode fluorescent bulb is complicated, and a high level control technique is required. Further, values of each circuit component are mainly distributed at a central portion and those distributed around the minimum (min) value in design account for a few percent. However, whether those distributed around the minimum value fall within an allowable range or not should be determined.

Figure 9A:
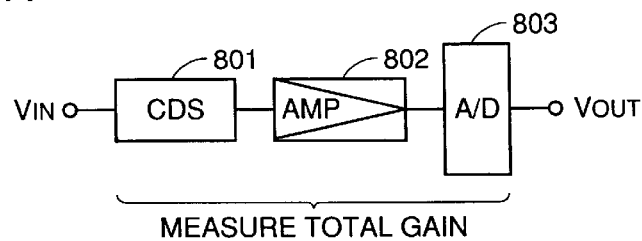
FIGS. 9A and 9B are provided for describing one example of a conventional light amount control system based on the concept of the circuit saturation level illustrated in FIG. 8.
Figure 9B:
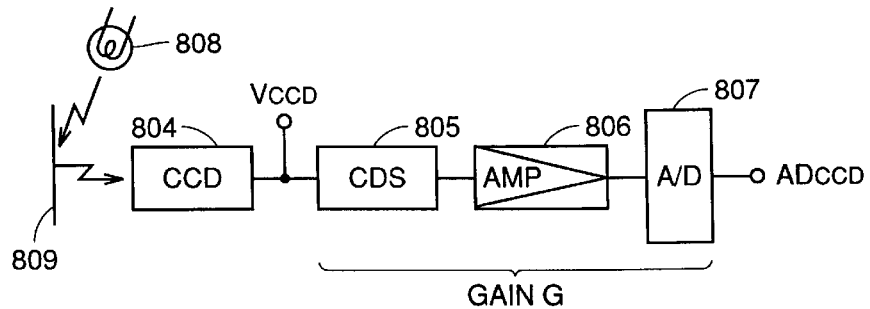

FIGS. 9A and 9B are provided for describing one example of a conventional light amount control system based on the concept of the circuit saturation level illustrated in FIG. 8.

As shown in FIG. 9A, gain G (amplification factor) of a single circuit is preliminary measured for each substrate by a substrate checker or the like. Specifically, a pseudo input signal with an input value $V_{IN}$ is first supplied to a CDS 801, any necessary signal component is sampled, and the input signal is amplified to a prescribed dynamic range at a signal amplifier circuit 802. Next the obtained signal is converted to a digital signal at an A/D conversion circuit 803 and output. An output value $V_{OUT}$ of the signal output from the A/D conversion circuit is measured, and output value $V_{OUT}$/input value $V_{IN}$ is calculated to obtain a total gain G of CDS 801-A/D conversion circuit 803.

Referring to FIG. 9B, light from a light source 808 such as an actual system (referring to a system actually available on the market) or a CCD adjustment system is directed onto an original document 809. The light reflected from the original document is read at a CCD 804 in a manner that allows an output to be obtained from an A/D conversion circuit 807 and an optical system. Specifically, $AD_{CCD}$ is output via CCD 804, a CDS 805, a signal amplifier circuit 806, and A/D conversion circuit 807.

Using the total gain G (amplification factor) specific to the circuit determined as shown in FIG. 9A, a CCD output $V_{CCD}$ obtained when a prescribed amount of light is directed onto a prescribed reflectance chart (shading plate etc.) is calculated according to Equation (2) below.

$$V_{CCD} = AD_{CCD}/G \quad (2)$$

The amount of light is controlled such that the CCD output $V_{CCD}$ thus determined falls between the minimum light amount of the system $V_{min}$ and the circuit saturation light amount $V_{max}$. According to this method, the scatter in the circuit gain can be individually fed back to increase the allowable ranges of both of the saturation level ($V_{max}$) and an image quality guaranteed level ($V_{min}$) compared with the method of controlling the light amount by design values only as illustrated in FIG. 8.

This method considers scatter in component design equally. Therefore, an allowable range is determined at a level far from the actual saturation level.

FIGS. 10A–10D are provided for describing a concept of how to determine the amount of the light received by the CCD according to the conventional concept for determining the circuit saturation level illustrated in FIG. 8.

FIG. 10A is a graph illustrating scatter in the CCD sensitivity. In FIG. 10A, the abscissa indicates the amount of incident light, and the ordinate indicates the CCD output.

Referring to FIG. 10A, the CCD output should represent the characteristic as illustrated by the central solid line that ideally changes linearly relative to the amount of incident light. However, actually there is scatter in the CCD sensitivity within a certain range. As a result, the CCD output has different upper and lower levels even if the amount of light is the same depending on the magnitude of the sensitivity as illustrated by the broken line.

FIG. 10B is provided for describing a case in which the CCD output is limited considering the CCD output saturation level.

Referring to FIG. 10B, there is also a certain scatter in the CCD output saturation level relative to the median considering the guarantee of the device. In any case, the amount of incident light is controlled to avoid saturation of the CCD output by providing a limitation at the device-guaranteed minimum saturation level to prevent the amount of light greater than that limitation from being supplied.

FIG. 10C is provided for describing a case in which the CCD output is limited considering the input saturation level of the CDS circuit in the stage following the stage of CCD output.

Referring to FIG. 10C, the CDS input saturation voltage may be lower than the CCD output voltage in some cases. In this case, control for further restricting the amount of light is required.

FIG. 10C' illustrates the amplifier input saturation level.

Referring to FIG. 10C', depending on cases, the amount of light should be controlled considering the CDS output signal level and the amplifier input saturation level.

FIG. 10D illustrates the maximum incident light amount when the CCD output is limited as illustrated in FIG. 10C.

Referring to FIG. 10D, the amount of light is limited actually at the maximum incident light amount shown in the figure, although a still higher level can be input.

FIGS. 11A–11C are provided for describing a concept of how to determine the amount of incident light of the CCD according to the present invention.

FIG. 11A is a graph illustrating a relation between the incident light amount and the CCD output voltage. In FIG. 11A, the abscissa indicates the incident light amount, and the ordinate indicates the CCD output.

Referring to FIG. 11A, the design median linearly changes as shown by the solid line. An actual output has a slope different from that of an ideal line as shown by the broken line due to scatter in the CCD sensitivity, scatter in the saturation output level and the like. Further, the CCD output value saturates at a value of real ability of CCD saturation output higher than the minimum saturation level.

FIG. 11B shows a relation between the CCD incident light amount and the CDS output voltage when a CCD output signal is supplied to the CDS in the following stage. In FIG. 11B, the abscissa indicates the amount of incident light, and the ordinate indicates the CDS output.

Description is given by assuming that the CDS input (output) saturation level is lower than the CCD output saturation level. If the CDS input (output) saturation level is higher than the CCD output saturation level, the CDS output is the same as the CCD output. Referring to FIG. 11B, when the amount of incident light increases, the output signal saturates at the CDS input (output) saturation level.

FIG. 11C illustrates a value of real ability of the maximum incident light amount of the entire circuit. In FIG. 11C, the abscissa indicates the amount of incident light, and the ordinate indicates the CCD output.

Referring to FIG. 11C, the saturation level of the circuit as a whole is determined according to any of the lower one of the CCD output saturation level and the CDS input (output) saturation level. The determination can be made taking into consideration the real ability of the CCD sensitivity and the circuit gain of the CDS and the like. In this case, range of the scatter value of each component is naturally smaller than the designed range of scatter. Therefore, the amount of light greater than the maximum incident light amount obtained by the design minimum (min) value shown in FIGS. 10A–10D can be supplied. However, only when values of respective components are the worst conditions in design, control of the amount of light leads to the same result as that obtained by the conventional design minimum (min) value.

According to the present invention, except for the worst conditions, conditions of components of combined devices achieve the best level of the amount of light by respective values of real ability, so that the quality of an image can be improved. In addition, the system-guaranteed minimum image quality under the worst condition in design can be achieved.

A method of measuring a readable level in the method of determining the circuit saturation level of the present invention is next specifically described.

Figure 12A:
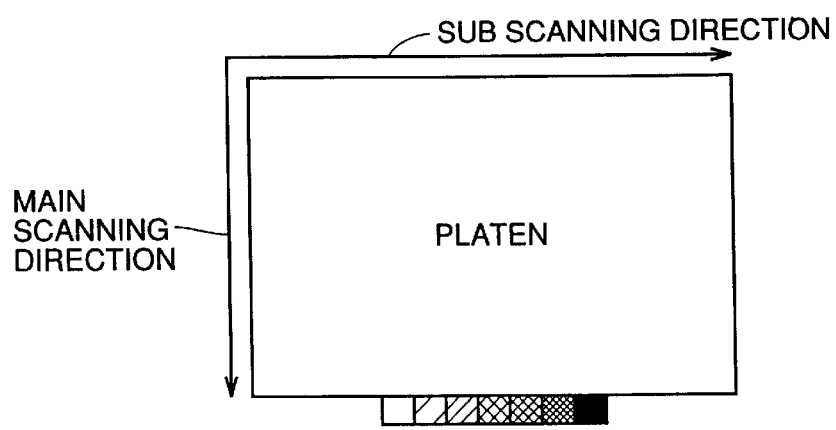
FIGS. 12A–12B illustrates one example of a gray scale used for controlling the amount of light incident on an original document according to the present invention.
Figure 12B:
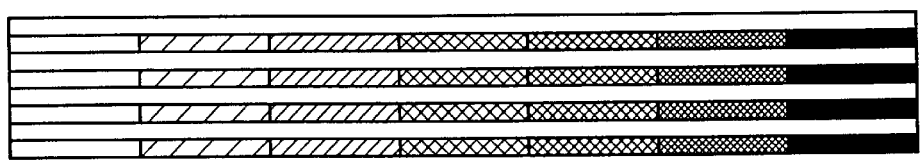

FIGS. 12A–12B illustrates one gray scale employed for controlling the amount of light incident on an original document according to the present invention.

Referring to FIG. 12A, the gray scale is a ladder gray chart having gray steps (density tones) in the sub scanning direction and the density varies in the main scanning direction. According to the invention, the circuit saturation level is measured by reading such a gray scale.

As illustrated in FIG. 12A, the gray scale having the gray steps is arranged in the sub scanning direction on the periphery of a platen (glass), and the gray scale is read by scanning it by a slider.

FIG. 12B shows an enlarged view of the gray scale shown in FIG. 12A. Referring to FIG. 12B, the gray scale has gray steps in the sub scanning direction and the ladder like change in density in the main scanning direction as described above.

Although the chart having the ladder-like gray steps based on a white ground is illustrated, a black ground may be employed instead.

The reason why such a chart is employed in the present invention is described later. Briefly, the gray steps are provided in the sub scanning direction in order to read the gray scale at the same points in an orientation such that the influence of orientation characteristic of the light illumination source is avoided. The ladder-like pattern where the density varies in the main scanning direction is employed in order to measure the saturation level that considers the slew rate of the circuit.

Although the gray scale where the density varies in the step manner representing a gray scale where the density roughly varies is employed for convenience of explanation, a gray scale having smaller steps or a gray scale where the density varies with no step may be employed.

FIGS. 13A–13E are provided for describing one example of a method of measuring the readable level according to the present invention.

Figure 13A:
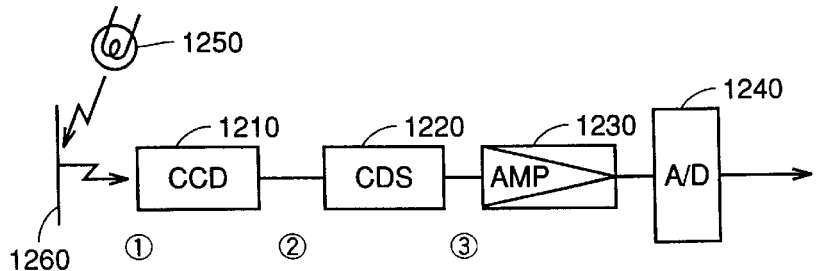
FIGS. 13A–13E are provided for describing one example of a method of measuring a readable level according to the present invention.

FIG. 13A is a block diagram illustrating a circuit that reads the gray scale shown in FIGS. 12A–12B. FIGS. 13B–13E illustrate a relation between a signal output and the reflectance of an original document at each point on a circuit when the gray scale shown in FIGS. 12A–12B is read.

Referring to FIG. 13A, light is directed from a light source 1250 onto a gray scale 1260, and the light reflected from gray scale 1260 is transmitted through a CCD 1210, a CDS 1220, an amplifier circuit 1230, and an A/D conversion circuit 1240 successively and output.

Referring to FIGS. 13B–13E, FIG. 13B illustrates a relation between the amount of light incident onto the CCD obtained by the reflected light from the gray scale and the reflectance of the chart.

Figure 13B:
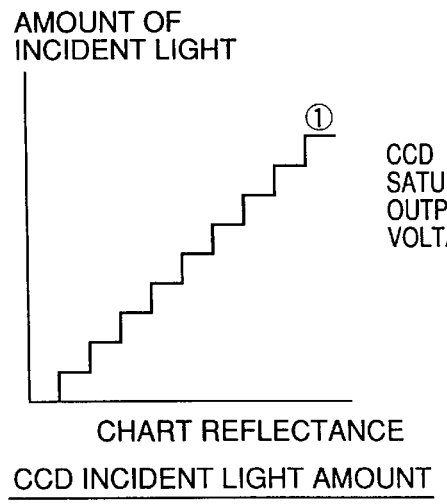

Referring to FIG. 13B, the amount of incident light on the CCD varies in a step-like manner according to the reflectance of the chart.

The reflectance of the gray scale refers to the reflectance of the portion where the density varies (portion except for the ground) in the ladder-like gray scale shown in FIGS. 12A–12B.

Figure 13C:
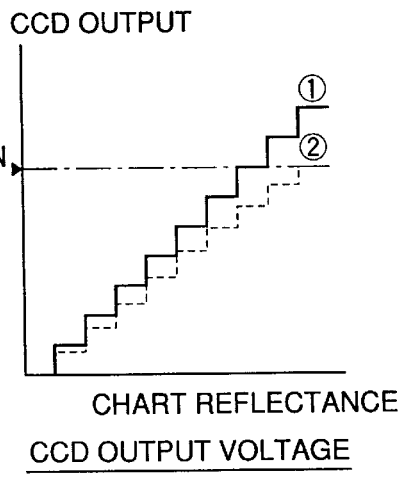

FIG. 13C illustrates a CCD output signal when the amount of light according to the reflectance of the chart is applied to the CCD. ① indicates the CCD incident light amount shown in FIG. 13B, and ② indicates the output signal level of the CCD.

Referring to FIG. 13C, the line indicating the CCD output signal level represented by the broken line of ② has a slightly different slope due to the influence of the CCD sensitivity relative to the line showing the CCD incident light amount represented by the solid line of ①. Since the case in which the CCD sensitivity is lower is illustrated in this figure, the slope of ② is smaller compared with that of ①. On the contrary, if the CCD sensitivity is higher, the slope of ② is larger compared with that of ①.

The line represented by ② shows an output characteristic that saturates at a certain level according to the CCD saturation output voltage.

Figure 13D:
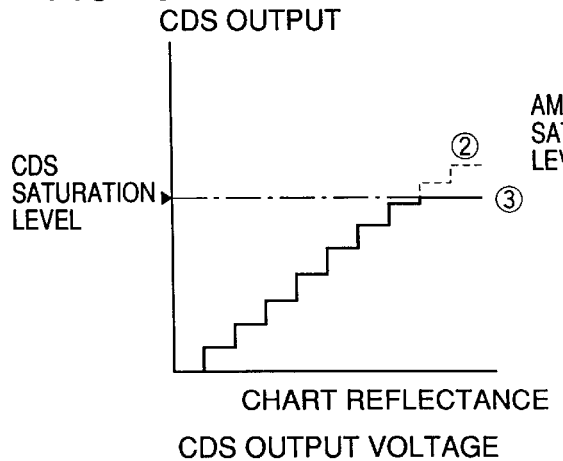

FIG. 13D illustrates an output signal when the CCD output signal is supplied to the CDS circuit provided at the following stage.

Referring to FIG. 13D, since the CDS circuit also has a saturation level, the CCD output signal represented by the broken line of ② saturates the CDS saturation level, and the signal is thus output with the characteristic shown by the solid line of ③.

Figure 13E:
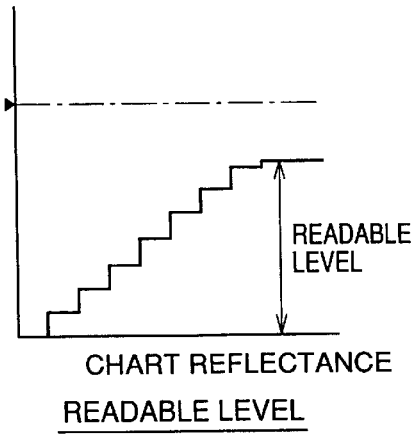

FIG. 13E similarly illustrates a signal characteristic at the signal amplifier circuit.

The figure shows that the saturation characteristic of the amplifier is superior to that of the CDS circuit and the output value of the amplifier is equal to the CDS circuit output value. Depending on the amplifier characteristic employed, if saturation is observed at a lower level than the CDS saturation level, the saturation level is similarly lower.

Referring to FIG. 13E, the readable level of the circuit as a whole can be measured as the readable level illustrated in FIG. 13E. What is obtained by the dynamic range taking into consideration the orientation characteristic may be fed back to the dynamic range of the A/D conversion circuit and the light amount level of the light source.

FIGS. 14A–14D are provided for illustrating another example of the method of measuring the readable level according to the present invention. This example is described based on the case in which the chart is arranged to have gray steps in the main scanning direction.

Figure 14A:
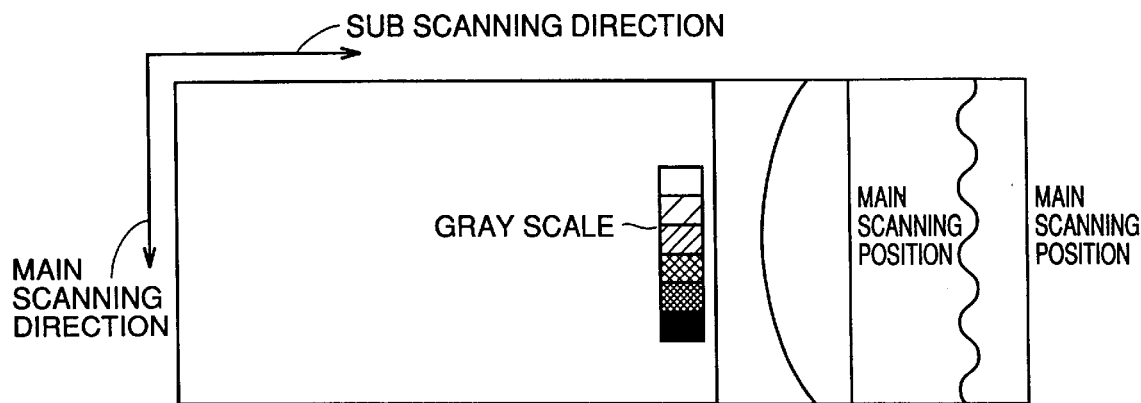
FIGS. 14A–14D are provided for describing another example of the method of measuring the readable level of the invention.

Referring to FIG. 14A, the gray chart having the gray steps in the main scanning direction is read to determine the circuit saturation level of the invention. In measurement of the circuit saturation level, if the light source is a fluorescent bulb, the orientation characteristic thereof is represented as a line having a swollen central portion as shown by ① of FIG. 14A. If the light source is a halogen lamp, the orientation is not uniform as illustrated by ② of FIG. 14A according to the shape of the filament.

Figure 14B:
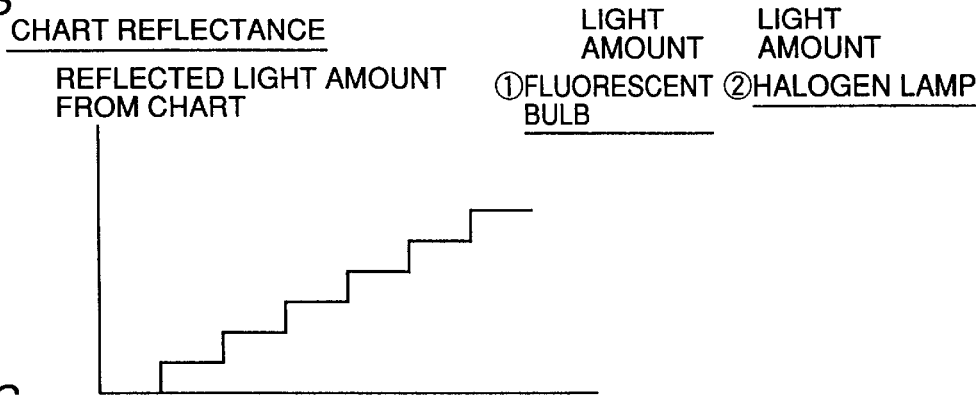

FIG. 14B illustrates the reflectance of the chart of the gray scale employed in this example. Referring to FIG. 14B, the gray scale has the reflectance that varies in a step-like manner.

Figure 14C:
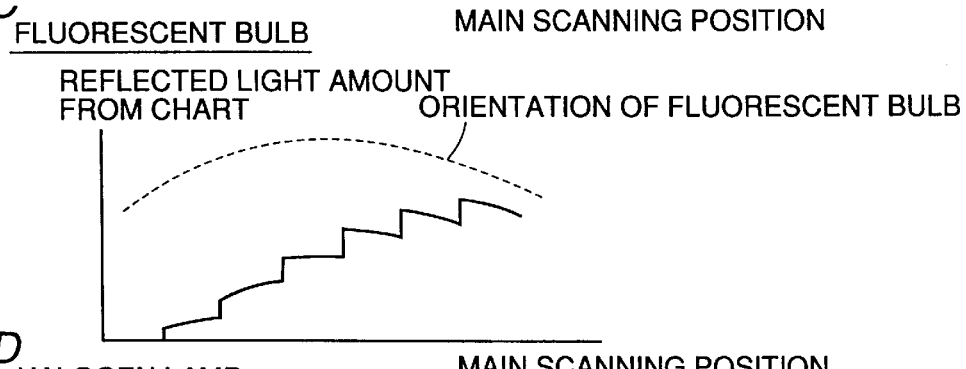
Figure 14D:
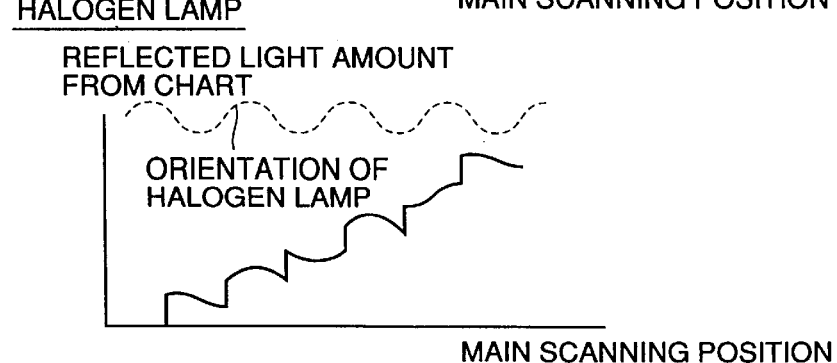

FIGS. 14C and 14D respectively show the amount of light reflected from the chart when the gray scale is read using the fluorescent bulb and the halogen lamp as the light source.

Referring to FIGS. 14C and 14D, the amount of light reflected from the chart is illustrated as outputs both influenced by the orientation characteristics of those light sources. In this case, the orientation characteristic may be corrected by data processing. However, in order to accurately measure the circuit saturation level, it may be better to arrange the chart such that the chart has gray steps in the sub scanning direction as described above.

Figure 15:
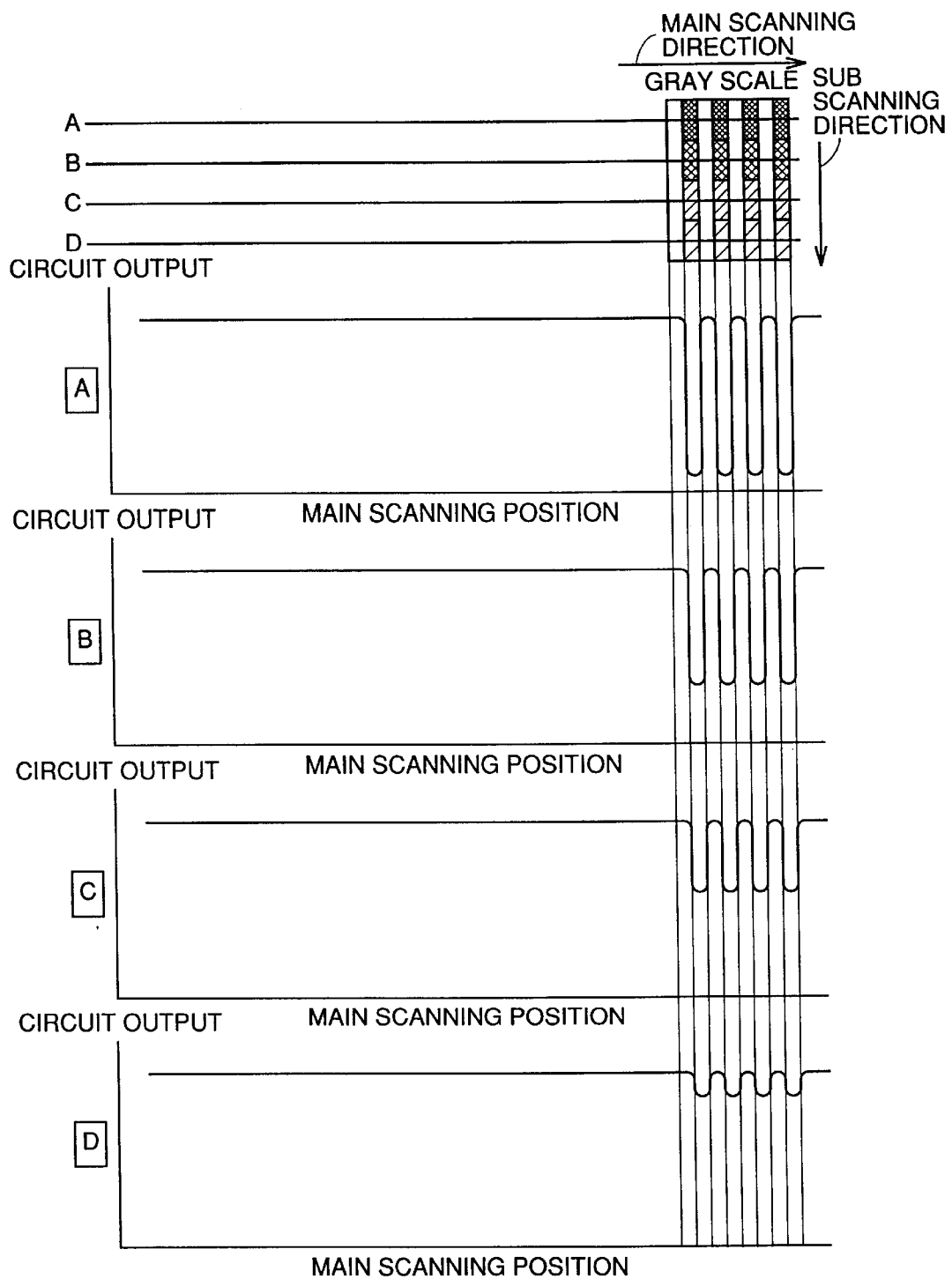
FIG. 15 shows read data in the main scanning direction when the ladder gray scale shown in FIGS. 12A–12B is actually read.

FIG. 15 illustrates read data in the main scanning direction when the ladder gray scale shown in FIGS. 12A–12B is actually read.

FIG. 15 illustrates circuit outputs when patches having different density levels are read at lines A, B, C and D. The portion having no gray scale is assumed to correspond to a white level to illustrate the circuit output. However, image data obtained by reading an original document cover plate are actually output.

In the direction from A to D, the reflectance of the gray scale becomes higher, so that the circuit output corresponding to the read gray patch portion changes. Because of a proper circuit slew rate, the white ground portion and the gray ground portion are clearly distinguished to be read. As described below, if the circuit slew rate is smaller than a prescribed value, variation in the output in the main scanning direction does not follow the variation in the gray scale, so that the ladder portion cannot be reproduced, and the correct reflectance of the gray chart cannot be reproduced.

Figure 16:
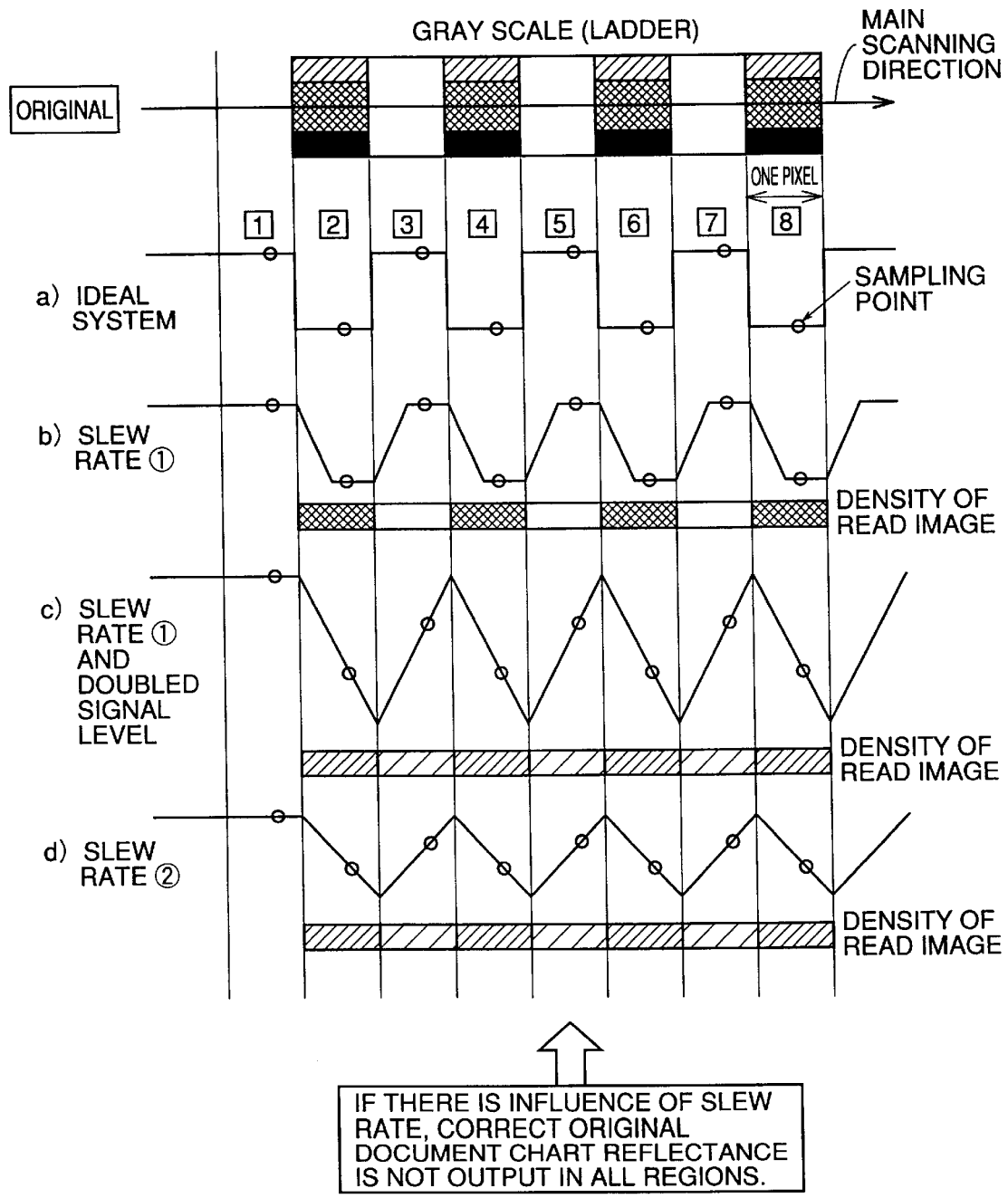
FIG. 16 illustrates an influence of a circuit slew rate when the ladder gray scale is read.

FIG. 16 illustrates an influence of the circuit slew rate when the ladder gray/scale is read.

The following description is applied to a case in which a prescribed density of the gray scale portion in FIG. 15 is read in the main scanning direction. Although the description is applied to a case in which the ladder portion of the gray scale is repeated pixel by pixel, actually the ladder spacing may be set according to the spec required by the actual system.

a) of FIG. 16 shows an output of a read signal when the circuit system is in the ideal state. Referring to a) of FIG. 16, the output value varies without delay in the circuit according to the density of the chart. With this state maintained, if data sampling, such as AD conversion, is performed as indicated by the symbol ○ in the figure, the chart density can be accurately reproduced. However, the actual circuit system has a prescribed circuit slew rate and a read output is different from the ideal one shown by a).

b) of FIG. 16 shows of a read signal output obtained by reading the gray scale by a circuit system having a prescribed slew rate ①.

Referring to b) of FIG. 16, the output changes at the point where the density changes in the gray scale, and the output becomes stable after a certain time has passed. Usually, sampling such as A/D conversion at the subsequent stage is performed in the period in which the signal is stable. Therefore, the chart density can be accurately reproduced for the read image data.

However, if the circuit saturation level is fed back to the amount of light of the light source for taking the maximum advantage of the circuit saturation level as in the present invention, any different output may be obtained at a sampling point depending on the output signal level even if the circuit slew rate is the same. This situation is described below by using the figure.

c) of FIG. 16 illustrates an output of a read signal in a circuit system having the same circuit slew rate ① as that of the circuit system of b) and a doubled output signal level. Referring to the figure, the circuit slew rate is the same as that illustrated in b) of FIG. 16. However, if the output signal level increases according to the increase in the amount of light of the light source and increase in the CCD sensitivity, the sampling point corresponding to that of b) of FIG. 16 does not represent a correct chart density since the point is in the transient period of the signal change. As a result, the image is read in the direction in which the change in density is smaller both in the ground and gray patch portions.

Even if the signal level is the same, the output may vary at the same sampling point depending on the circuit slew rate. This situation is described below using the figure.

d) of FIG. 16 illustrates an output of a read signal in a circuit system where a slew rate ② thereof is slower than that of b) and the signal level is the same. Referring to the figure, although the signal level is the same as that shown in b) of FIG. 16, if the circuit slew rate becomes smaller, the sampling point corresponding to that of b) of FIG. 16 does not represent a correct chart density since the point is in the transient period of signal change. Accordingly, the image is read in the direction in which the change in density is smaller in both of the ground and gray patch portions.

If there is an influence of the slew rate, the correct reflectance of the original chart is not output in all regions.

Figure 17A:
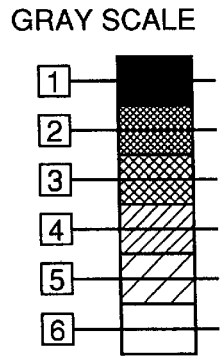
FIGS. 17A–17C are provided for describing detection of the saturation level by the ladder gray scale.
Figure 17B:
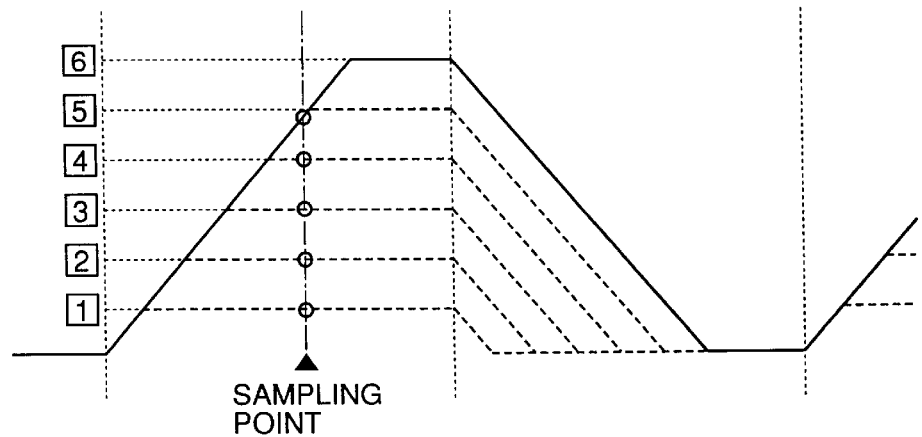
Figure 17C:
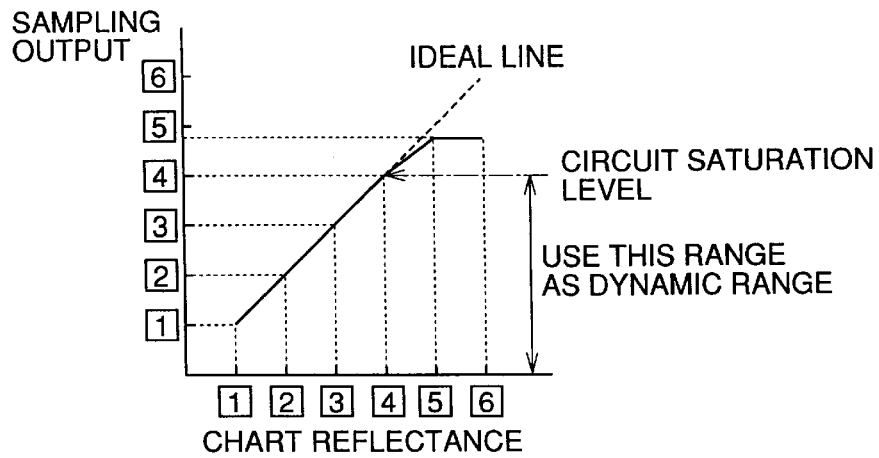

FIGS. 17A–17C are provided for illustrating detection of a saturation level using a ladder gray scale. Referring to FIGS. 17A–17C, the image reading characteristic illustrated in FIG. 16 is described with the gray density step changed.

FIG. 17A illustrates a ladder-like gray scale having density steps in the sub scanning direction. FIG. 17B shows a signal output when lines of 1 to 6 are read at the gray scale shown in FIG. 17A in the main scanning direction. The density of the ladder pattern is assumed to change pixel by pixel for convenience of explanation.

Referring to FIG. 17B, if the density of the chart is changed from 1 at those sampling points in the figure, the signal output accordingly changes successively. It can be observed that the signal level changes without saturation even if a white pattern of the scale 6 is read.

Referring to those sampling points indicated by ○ in the figure, a normal read value is output at those points up to scale 4. However, at scale 5, although no saturation is observed, a correct value is not output as sampling data.

FIG. 17C illustrates a relation between the reflectance of the chart and the sampling output. Referring to FIG. 17C, the value obtained by reading an image represents an output characteristic that shows saturation from a certain level relative to an ideal line.

In this case, if a chart of a gray scale having a solid patch is used for measurement, a similar phenomenon occurs only at an edge portion at the end of the patch since the circuit does not saturate, and a correct image is output at a central portion of the patch where no density variation is observed.

After the amount of light is adjusted in this state, if an original document such as a character document including a high frequency component is read, a correct value is not obtained at those sampling points described above, resulting in degradation of the MTF characteristic. Accordingly, the chart may be determined by defining the ladder spacing of the gray scale depending on how much of the MTF characteristic should be ensured with the spec of the real system. In other words, by employing the ladder-like gray scale with density variation in the main scanning direction, the circuit characteristic can be measured considering both of the circuit saturation level and the circuit slew rate according to the present invention.

The ladder gray scale is described above using FIGS. 15–17C. Next using FIGS. 18–20C, a gray scale having a solid patch is described.

Figure 18:
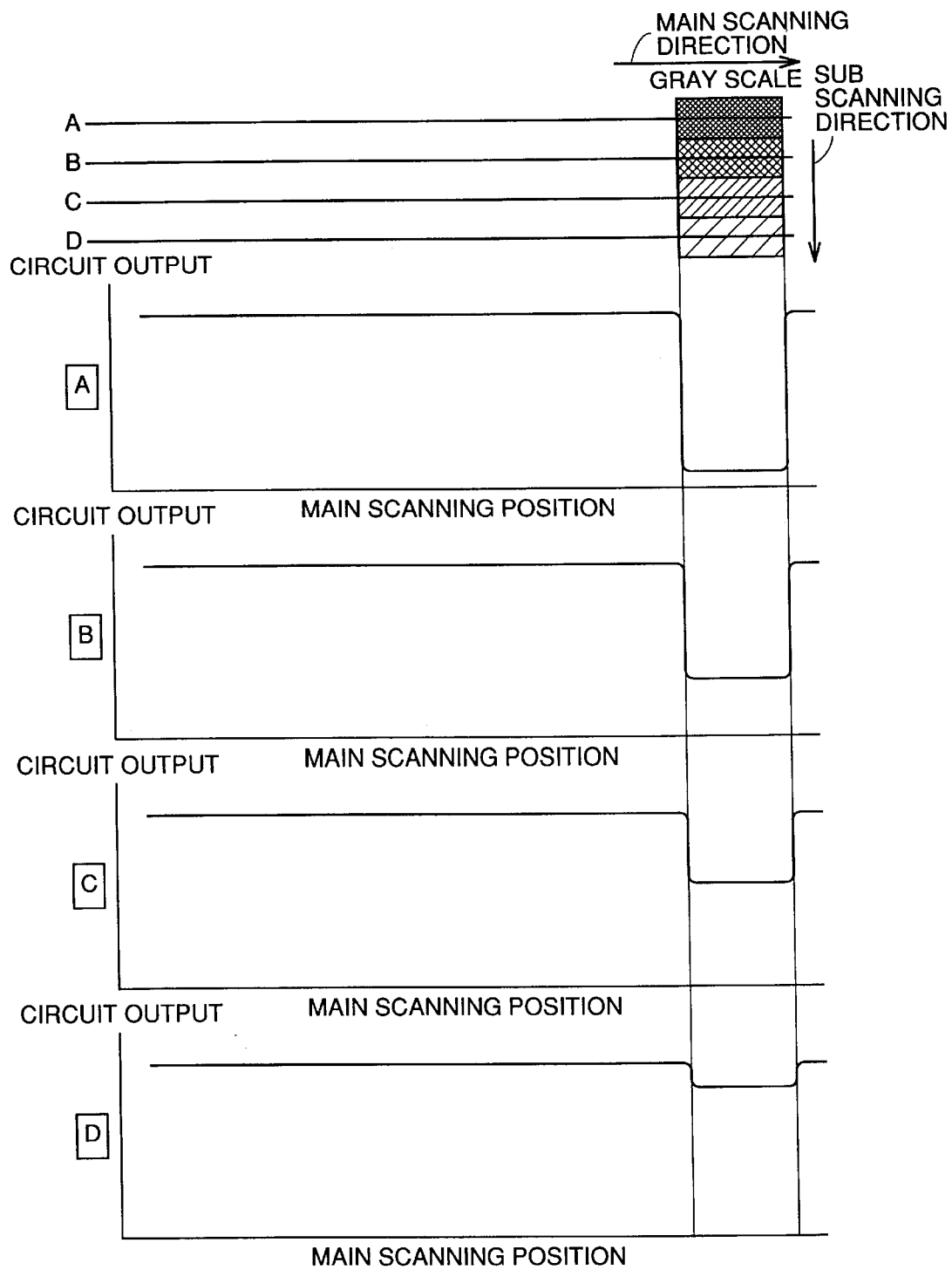
FIG. 18 illustrates read data in the main scanning direction when a solid gray scale is actually read.

FIG. 18 illustrates read data when the solid gray scale is actually read in the main scanning direction.

Referring to FIG. 18, the figure illustrates circuit outputs when those patches having different density levels corresponding to four lines of A, B, C and D are read. Although the portion having no gray scale is assumed to correspond to a white level for illustrating the circuit output, actually image data obtained by reading an original document cover plate or the like are output.

In the direction from A to D, the reflectance of the gray scale becomes higher so that the circuit output of the read gray patch portion varies.

Figure 19:
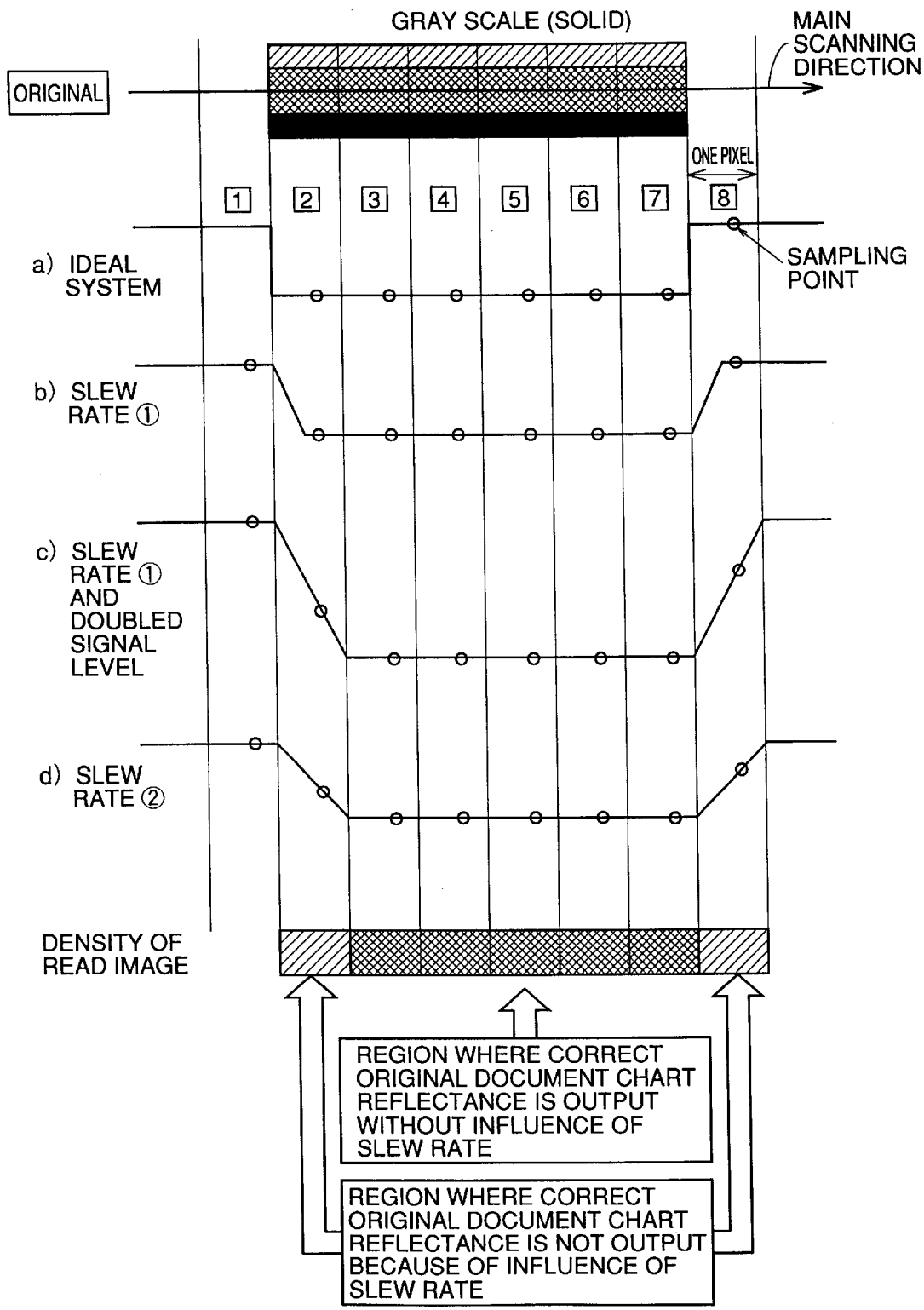
FIG. 19 illustrates an influence of the circuit slew rate when the solid gray scale is read.

FIG. 19 illustrates an influence of a circuit slew rate when the solid gray scale is read.

A result obtained when a prescribed density of the gray scale portion in FIG. 18 is read in the main scanning direction is described below.

a) of FIG. 19 illustrates an output of a read signal when the circuit system is in the ideal state. Referring to the figure, an image signal according to the reflectance of the chart is output at the gray patch portion. With this state maintained, when data sampling such as A/D conversion is applied as shown by ○ in the figure, the chart density is correctly reproduced. However, since the actual circuit system has a prescribed circuit slew rate, the read output is different from the ideal one shown by a).

b) of FIG. 19 illustrates an output of a read signal when the gray scale is read by a circuit system having a prescribed slew rate ①.

Referring to b) of FIG. 19, a correct image signal is output similarly to the case in which the ladder-like gray pattern described above is employed.

c) of FIG. 19 illustrates an output of a read signal in a circuit system having a doubled signal level and having the circuit slew rate (a which is the same as that of b). Referring to the figure, the signal output does not reach a circuit saturation level. Therefore, a correct image signal is not output due to the influence of the slew rate for pixel 2 and pixel 8 of the edge portion of the gray pattern. For a central portion except for those pixels, a correct image output is obtained since the circuit does not saturate.

d) of FIG. 19 illustrates an output of a read signal in a circuit system having a signal level which is the same as that of b) and having a slew rate smaller than that of b). Referring to the figure, if the slew rate is smaller, a correct image signal is not output for pixel 2 and pixel 8 of the edge portion of the gray pattern. For the central portion other than those, a correct image output is obtained since the circuit does not saturate.

The correct reflectance of the chart for an original document is not output due to the influence of the slew rate for pixel 2 and pixel 8 as described above. However, for pixels 3–7, the correct reflectance of the chart is output without the influence of the slew rate.

FIGS. 20A–20C are provided for illustrating detection of a saturation level by using a solid gray scale.

Referring to FIGS. 20A–20C, the image reading characteristic illustrated in FIG. 19 is described with the gray level changed.

FIG. 20A shows a gray scale where the gray level changes in the sub scanning direction. FIG. 20B illustrates a signal output obtained when the gray scale shown in FIG. 20A is read at lines 1 to 6 in the main scanning direction. FIG. 20C illustrates a relation between the reflectance of the chart and a sampling output at sampling points A and B respectively.

Referring to FIGS. 20B and 20C, when gray patches 1–6 shown in FIG. 20A are successively read, at a sampling point A of the edge portion of the chart, a read signal output changes according to the reflectance of the chart for gray patches 1–4. For gray patches 5 and 6, a correct output cannot be obtained.

At a sampling point B, since input of a white level of gray patch 6 does not allow the circuit to reach a saturation level, a correct image signal is output regardless of the circuit slew rate.

When the gray scale is read, gray patches 1 to 6 can be read. However, when an original document such as a character original document including a high frequency component is actually read, sufficient gradation cannot be obtained.

In addition, although determination may be made using only the data of the edge portion of the chart, detection of the edge and the like is necessary and improvement of the accuracy is difficult since there is only one edge portion.

A circuit characteristic can be understood more accurately by measuring the circuit characteristic utilizing the ladder gray chart according to the present invention described above.

Figure 21:
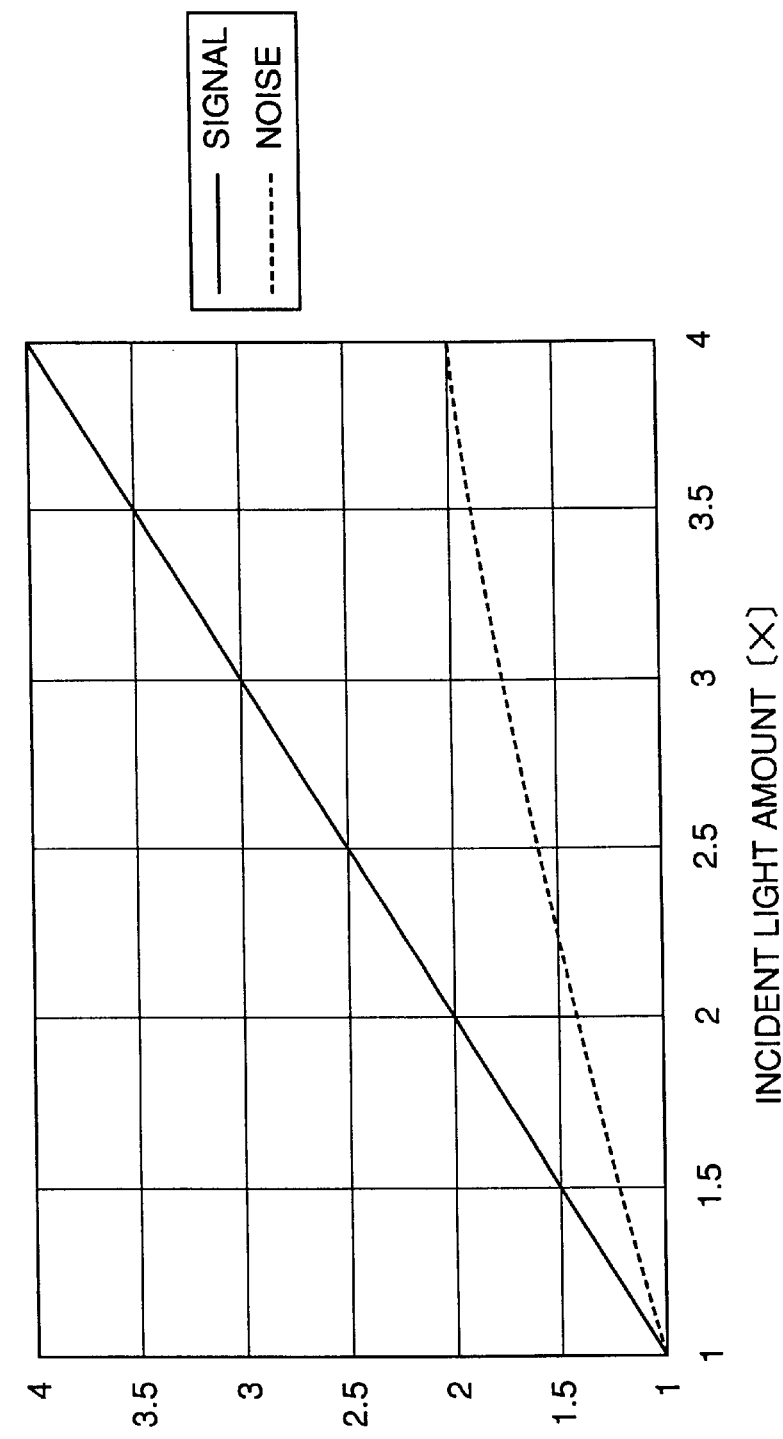
FIG. 21 illustrates a relation between the amount of incident light and an output signal.

FIG. 21 illustrates a relation between the amount of incident light and an output signal.

Referring to FIG. 21, although the signal output increases proportionally to the amount of incident light, the S/N ratio becomes higher as the amount of incident light increases since the noise component increases proportionally to $\sqrt{2}$.

The method of correcting the difference in the dynamic range due to the difference between the peak position of the light source orientation characteristic (position where the light amount reaches its peak because of the orientation characteristic of the light source) and the point at which the gray scale is measured is described below.

Figure 22:
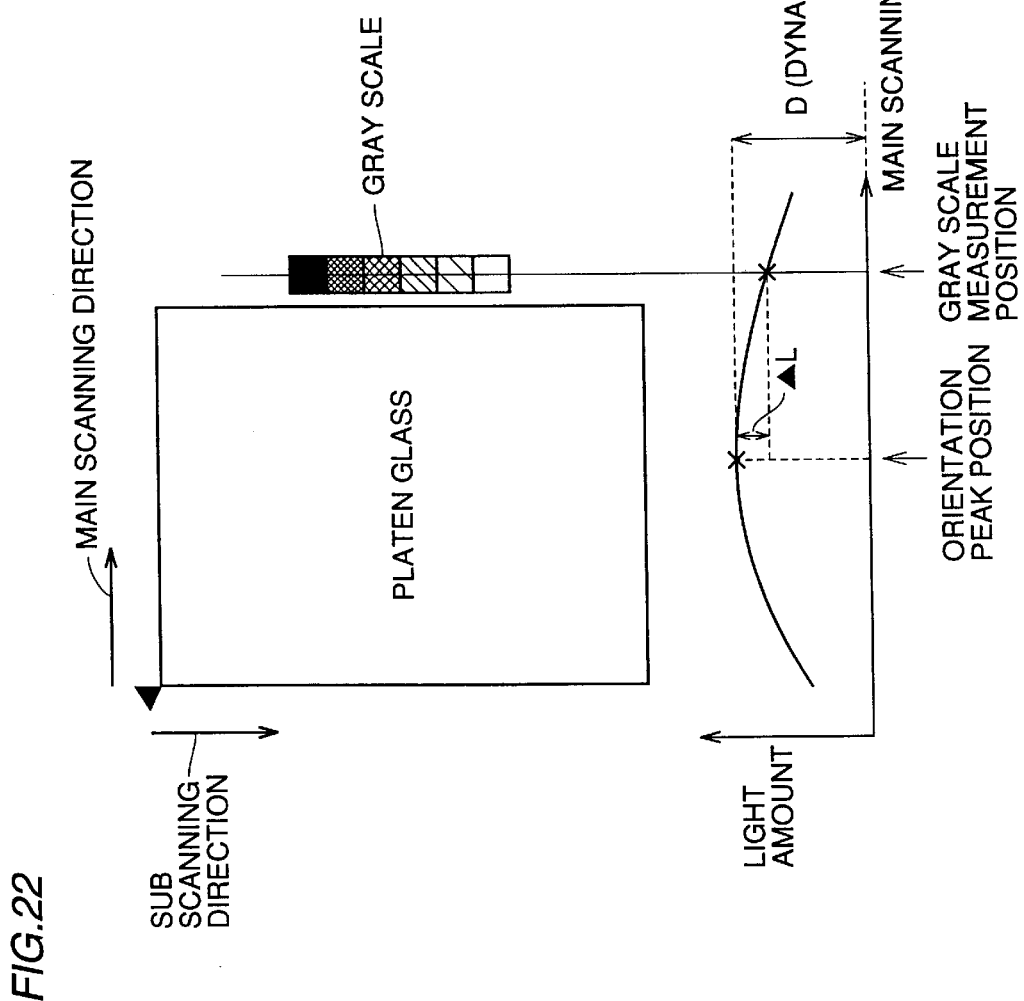
FIG. 22 is provided for describing a method of determining dynamic range.

FIG. 22 is provided for describing a method of determining the dynamic range.

If a fluorescent bulb with large orientation change is employed as a light source, the gray scale should be arranged in the peripheral portion where the amount of light decreases. If the amount of light of the lamp is set according to the circuit saturation characteristic obtained by the gray scale thus arranged, the circuit could saturate regardless of the determination concerning whether the signal level saturates or not that is fed back to the amount of light of the lamp, since the amount of light is larger in the vicinity of the central portion of the platen glass where the orientation peak is observed.

In order to avoid this situation, the amount of light should be set by preliminarily reading a shading plate or the like, obtaining an orientation characteristic in the main scanning direction, and feeding back a difference L between the amount of light at the sampling position of the gray scale and the amount of light at the orientation peak position.

Figure 23:
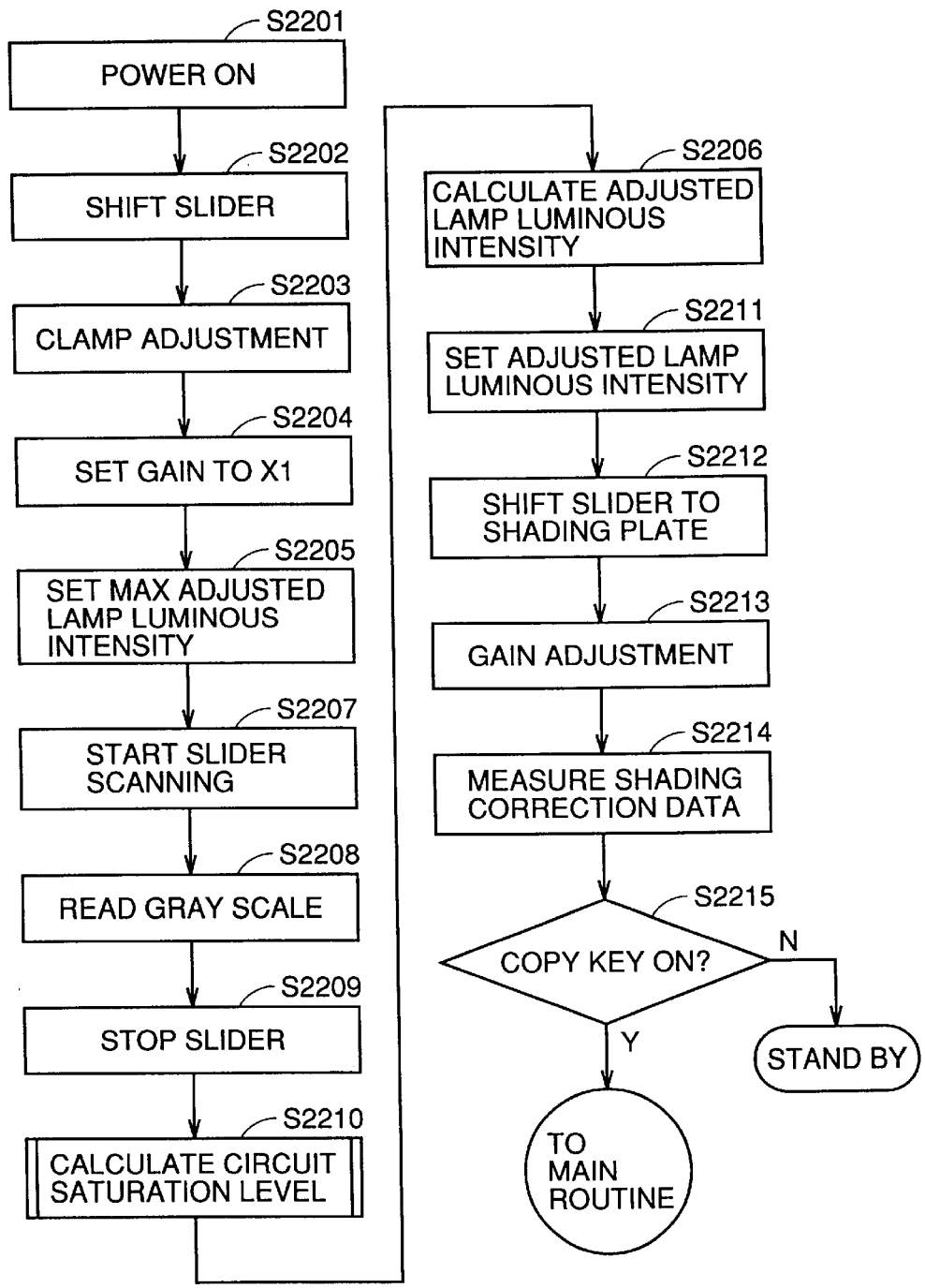

FIG. 23 is a flow chart illustrating one example of an operation sequence started when the power source is turned on.

Referring to FIG. 23, when the power source is turned on (S2201), a prescribed initial operation is performed. When a control sequence becomes stable, a slider is shifted to the position of a shading plate (S2202). A clamp adjustment is executed for black level compensation of a reading circuit system (S2203).

The circuit gain is next set to X1 (S2204) so as to avoid unnecessary saturation of the circuit. When these preliminary operations are completed, the adjusted lamp luminance intensity is set to the maximum (max) value, and the lamp is turned on (S2205).

Waiting for a prescribed time until the amount of light of the lamp becomes stable, the slider is allowed to start scanning (S2207), and reads a gray scale (S2208). When the slider scans it to a position to be stopped, the slider is stopped (S2209).

The saturation level of the reading circuit system is calculated from the gray scale data thus read (S2210), the maximum adjusted lamp luminance intensity is determined from the saturation level (S2206), and the value is set at the light source (S2211).

The slider is moved to the position of the shading plate (S2212), gain adjustment is performed with an optimum amount of light of the lamp considering the saturation level of the circuit (S2213), and shading correction data for correcting the lamp orientation and the error in CCD image sensitivity are measured (S2214).

Determination is next made as to whether a copy key is pressed or not (S2215). If the copy key is pressed, the main routine shown in FIG. 2 and described above is followed. If the copy key is not pressed, a standby mode is set.

Figure 24:
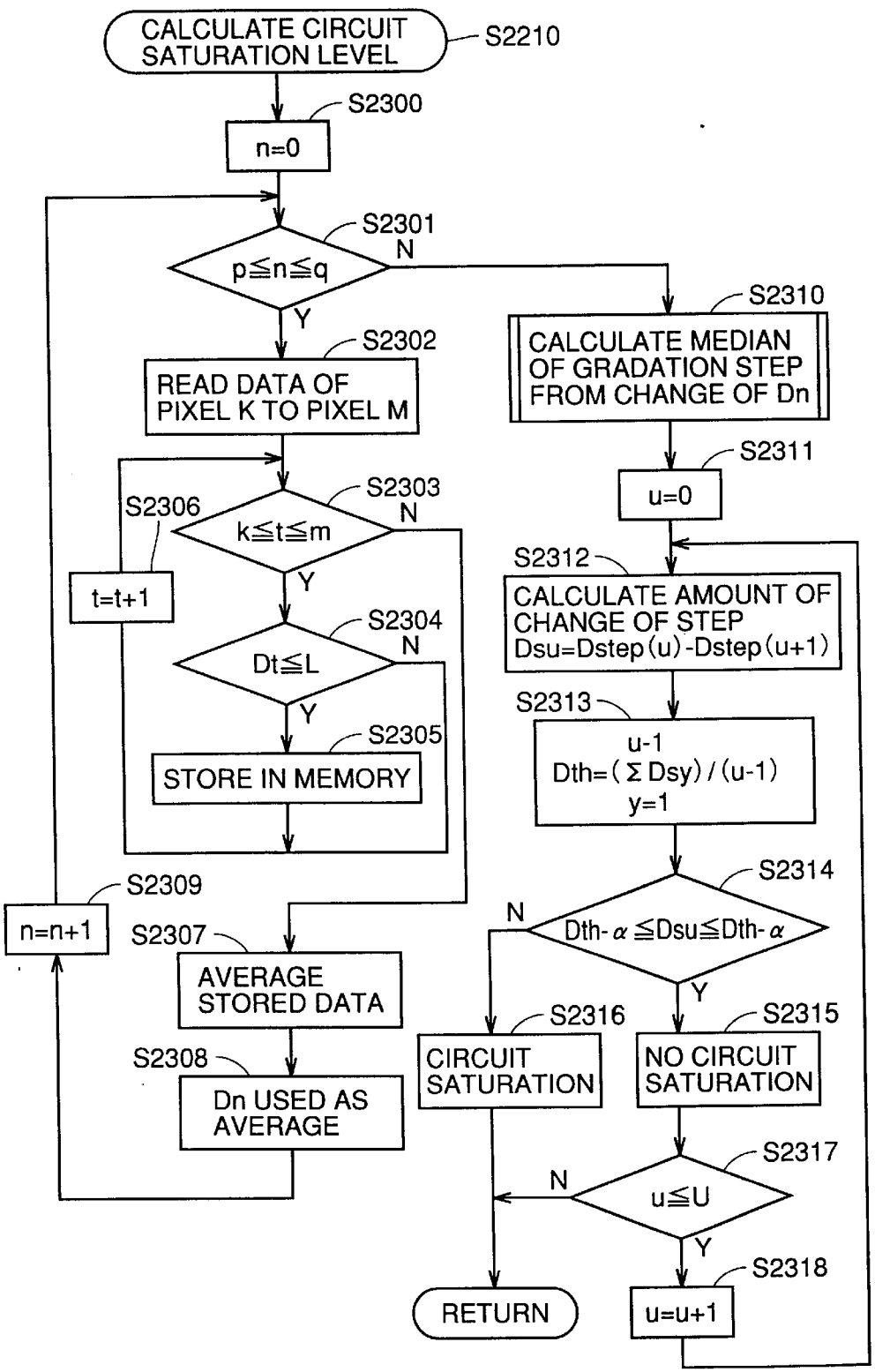
FIG. 24 shows a flow chart illustrating an operation of calculating the circuit saturation level which is one of the subroutines in the operation sequence followed when the power source is turned on as shown in FIG. 23.

FIG. 24 is a flow chart illustrating a process operation for calculating the circuit saturation level that is one of subroutines in the operation sequence illustrated in FIG. 23.

Referring to FIG. 24, the number of lines n in the sub scanning direction is first reset (S2300), and whether n is within the range from p to q or not is determined in order to process only the data located from "p line" to "q line" corresponding to the position of the gray scale (S2301). If n is within the range from p to q, "k to m-th" pixel data in each line are read (S2302).

Next, whether a noted pixel t is within a range from k to m or not is determined in order to detect the gray level of the central portion corresponding to "k pixel" to "m pixel" in the main scanning direction of the gray scale (S2303).

If t is within the range from k to m, whether image data $D_t$ of the noted t-th pixel are greater than a prescribed threshold level L or not is determined (S2304). Accordingly, whether the t-th pixel is placed at the ground portion or the gray portion of the gray ladder chart is determined. If it is determined that image data $D_t$ is equal to or less than threshold L and is the data corresponding to the gray patch portion, the data are stored in a memory (S2305). If it is determined that image data $D_t$ are greater than threshold L and are the ground portion, the data is not stored in the memory and an increment is added to the number of pixel "t" (S2306).

The process described above is repeated up to the range of gray scale measurement m.

After the process is completed when the noted pixel t becomes greater than m (t>m), the average of the stored data is calculated (S2307), and the average value is used as the gray level value $D_n$ of the n-th line (S2308). In order to perform similar process for the next line, an increment is added to the number of line n (S2309), and determination is made as to whether n is within the range from p to q in the sub scanning direction (S2301). When n is out of the range from p to q, the median of the gradation steps is calculated from the change in $D_n$ (S2310). Details of this process is described below.

The data number "u" is cleared in order to calculate the amount of change in gradation "$D_{su}$" for each step from calculated read data of each gray step (S2311). The amount of change in gradation between steps is calculated based on following Equation (3) (S2312).

$$D_{su} = D_{step}(u) - D_{step}(u+1) \tag{3}$$

The standard for determination $D_{th}$ for determining whether the change in gradation is appropriately represented is calculated based on following Equation (4) (S2313).

$$Dth = \left(\sum_{y=1}^{u-1} Dsy\right) / (u-1) \tag{4}$$

Determination is next made as to whether the amount of change in gradation $D_{su}$ is in the range from $D_{th}-\alpha$ to $D_{th}+\alpha$ (S2314).

If the amount of change in gradation $D_{su}$ falls within the range from threshold $D_{th}-\alpha$ to $D_{th}+\alpha$, it is determined that a correct gradation change is read and the circuit does not saturate (S2315). On the other hand, if the amount of change in gradation $D_{su}$ does not fall within the range from threshold $D_{th}-\alpha$ to $D_{th}+\alpha$, it is determined the circuit saturates or the circuit saturates due to another error factor (S2316).

Threshold $D_{th}$ is determined by averaging the amount of change in gradation of the step preceding the noted step successively. Therefore, if there is any scatter in the change in density of each step when the gray scale is read due to any error in the CCD sensitivity, circuit gain and the like, a suitable value considering these error factors can be determined. However, any preliminary prepared threshold value may be used for determination if the threshold value can be set considering these error factors in advance.

Next, an increment is added to the noted step number u (S2318), and this process is repeated accordingly. When the circuit saturates or the state of u>U leads to determination that the circuit does not saturate in all gradation steps in the gray scale, this sequence returns.

Figure 25:
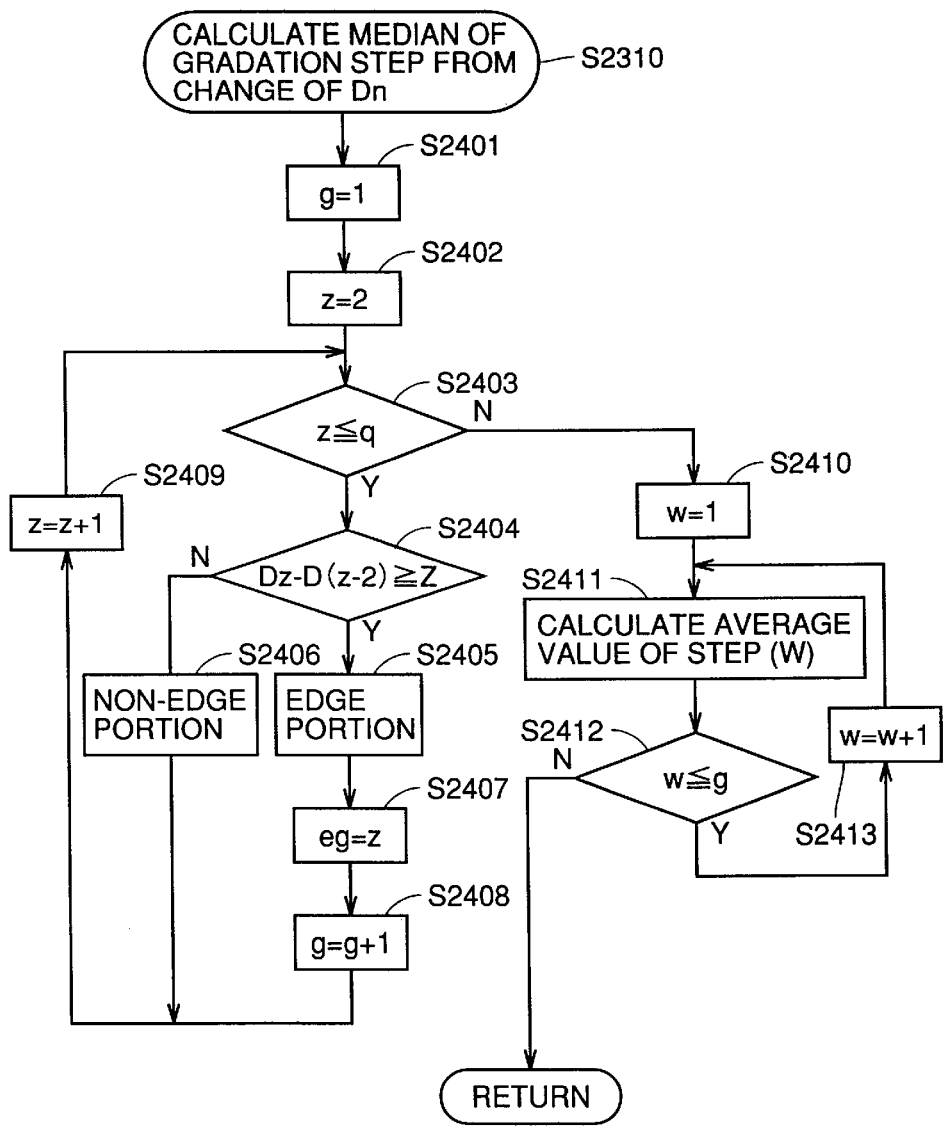
FIG. 25 shows a flow chart illustrating a sequence of calculating the median of gradation steps of the read gray scale which is one of subroutines in the process sequence of circuit saturation level calculation shown in FIG. 24.

FIG. 25 is a flow chart illustrating a sequence of calculating the median of a gradation step of the read gray scale that is one of subroutines of the process sequence for calculating the circuit saturation level illustrated in FIG. 24.

Referring to FIG. 25, "g" for numbering an edge that is detected is cleared (S2401).

The line number "z" of the read gray scale is set to 2 (S2402). Determination is made as to whether z is at most "q" at the end of the gray scale or not (S2403). If $z \leq q$, the difference between the gray density "$D_z$" of a noted line and "$D_{z-2}$" of a line preceding the noted line by two lines is calculated, and whether the result is at least a prescribed threshold Z or not is determined (S2404).

If $D_z - D_{z-2} \geq Z$, the noted line is determined to be the edge portion (S2405). If $D_z - D_{z-2} < Z$, the noted line is determined not to be the edge portion without change of gradation (S2406).

If the noted line is determined to be the edge portion, the line number "z" at that time is stored as eg (S2407), and then an increment is added to the edge number "g" (S2408). In order to apply a similar process to a next noted line, an increment is added to line number "z" (S2409). The successive operations are repeated until a process for the end of the gray scale "q" is completed. At the point of z>q, the processes described above are completed, and a next process for determining average data for each gradation step is performed.

The step number "w" is first cleared (S2401). By calculating the average of data between edges "step (w)" thus determined in the preceding process, a density value of the gradation step is obtained (S2411).

Whether w is equal to or less than g or not is determined next (S2412). This process is repeated until w exceeds g. If w>g, the procedure returns when w exceeds g. If w≦g, an increment is added to "w" (S2413).

Distinction between the ground and the gray patch when the gray scale is read is described below.

Figure 26:
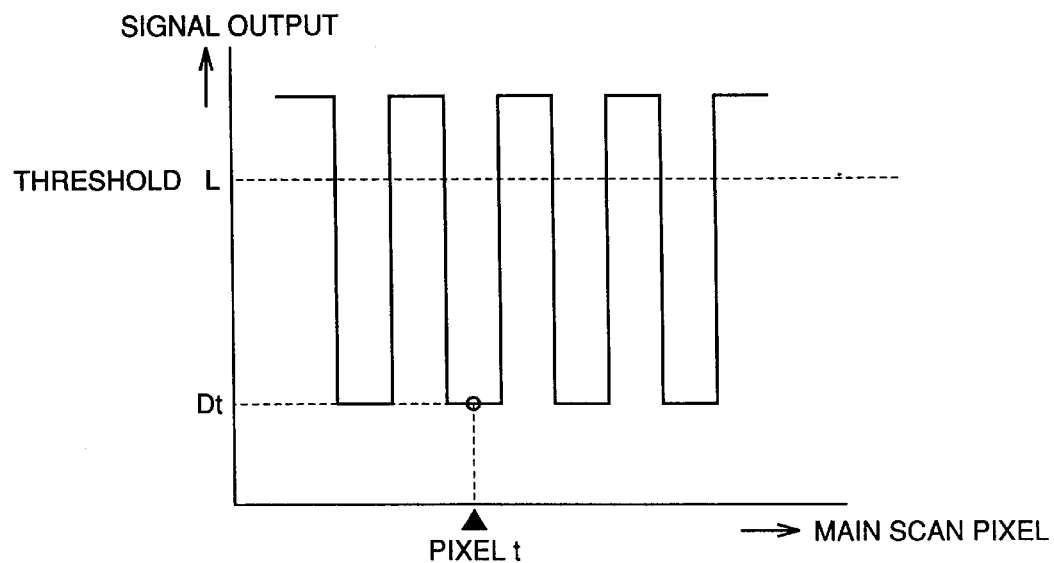
FIG. 26 illustrates extraction of a read value of the gray scale.

FIG. 26 shows extraction of read values of the gray scale.

The gray scale for measurement employed in the present invention is formed as a ladder pattern having change in density in the main scanning direction as described above. Accordingly, if the read data of the gray pattern are averaged as they are, the correct gray level cannot be detected since both of the portions of the gray patch and the ground are averaged.

Only the peak value may be detected to be used as the read level of the gray patch. The method of averaging several data for enhancement of the accuracy is often used. However, simple averaging leads to the insufficiency as described above. In order to avoid this, using the predetermined threshold L, a limitation is set to the read data of each pixel and data equal to or less than the threshold value is determined as read data of the gray patch as illustrated in FIG. 26.

Referring to FIG. 26, read data $D_t$ of pixel t, for example, is smaller than threshold L. Accordingly, the data is determined to be read data of the gray patch, not to be of the ground level. Since the gray scale herein described is based on the ground of the white level, such determination may be appropriate. However, if the ground is the black level, an opposite determination is necessary.

Figure 27:
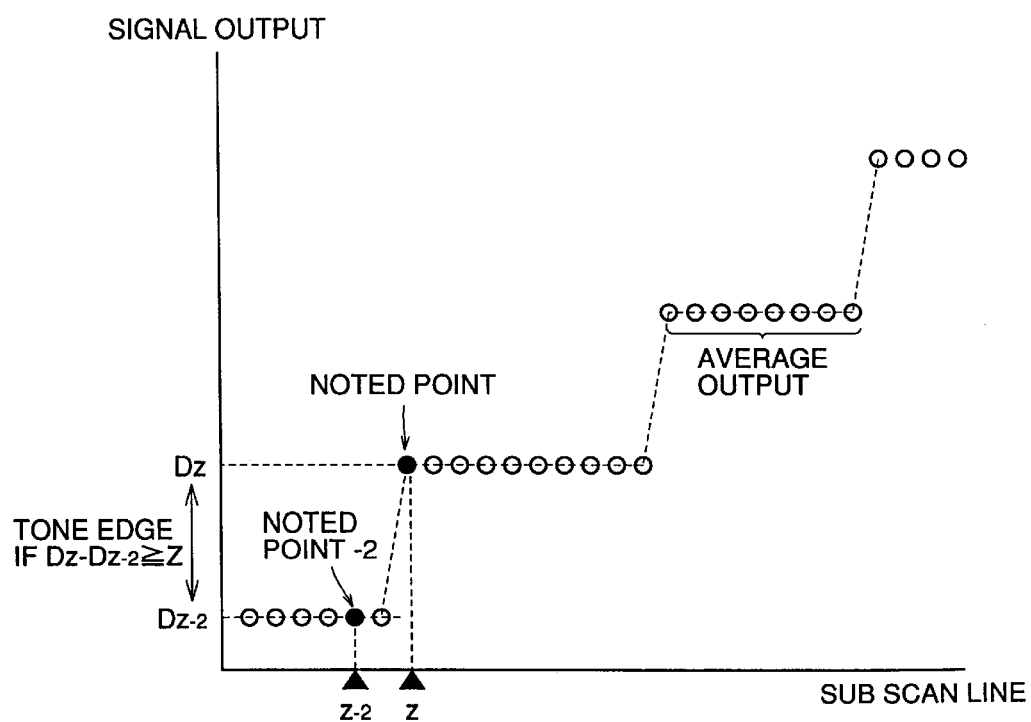
FIG. 27 is provided for describing a method of detecting the edge of the gradation step shown in FIG. 25.

FIG. 27 is provided for describing a method of detecting the edge of the gradation step described in conjunction with FIG. 25.

The graph of FIG. 27 is obtained by plotting average values of the data of only the gray patch portion line by line as described in conjunction with FIG. 26 so that the abscissa indicates the number of lines in the sub scanning direction and the ordinate indicates the signal output.

In this case, the reflectance of the patch of the gray scale varies in the step-like manner successively, and accordingly the graph having the step-like change is obtained as shown in the figure.

To take an example of a noted point "z", if the difference between read signal "$D_z$" of the noted point "z" and read data "$D_{z-2}$" of "z-2" located two lines before the noted point "z" is greater than a prescribed threshold Z, it is determined that there is a difference between read data of the two points and the portion corresponding to the data is the edge portion of the gray step.

The region except for the edge portion shows scatter in read data due to image noise and the like. However, if the region is accurately read, approximately the same values are obtained and the difference therebetween is equal to or less than threshold Z. In this case, the region is not determined as the edge portion and it is determined that the same gray patch continues.

The reason why data of the noted point and the point preceding the noted point by two lines are compared is explained below. Specifically, in the region of the edge portion where the density varies, an ideal change cannot be obtained due to manufacture of the chart or the influence of the optical system or the like. Therefore, if data of lines adjacent to each other are compared, there is no noticeable change and a sufficient margin cannot be observed for threshold Z. For this reason, data of the noted point and that of the point two lines before the noted point are compared to obtain a certain margin.

Preferably, points for comparison are determined depending on the degree of influence of such factors as described above.

After the edge portion of the gradation is detected by the method described above, data of the flat portion between the edge points are averaged. As a result, an average read value of the gray patch can be determined.

A method of detecting the circuit saturation level from the average signal output value of each gray patch as described above is explained below.

Figure 28:
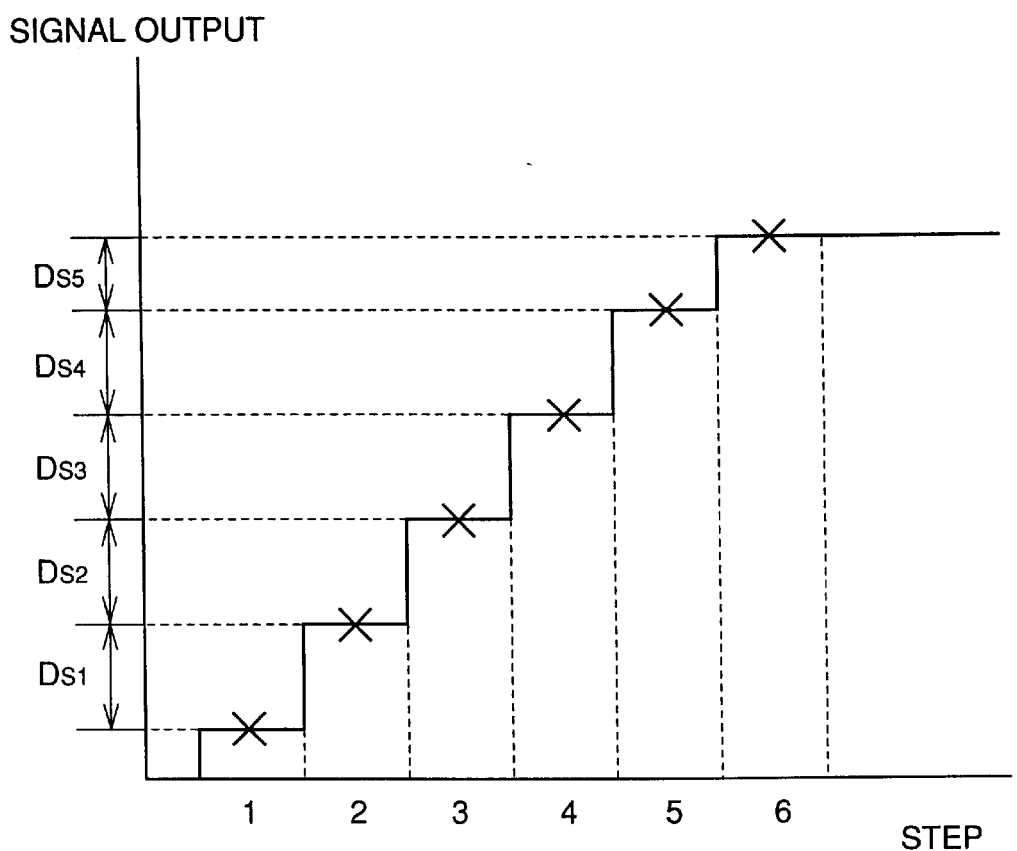
FIG. 28 is provided for describing determination of the change in the gradation step.

FIG. 28 is provided for describing determination of the change of gradation steps.

Referring to FIG. 28, an average output of each gray patch determined by the method described in conjunction with FIG. 27 is plotted so that the abscissa indicates the gray step and the ordinate indicates the signal output value.

"$D_{s1}$" to "$D_{s5}$" are determined by calculating the difference between signal values of respective steps.

By using "$D_{s1}$" as a basis, determination is made as to whether "$D_{s2}$" to "$D_{s5}$" fall within the following ranges. If respective values are within the ranges, the circuit is determined not to saturate.

$D_{s2}$: Within "$D_{s1} \pm \alpha$" ?
$D_{s3}$: Within "average value of $D_{s1}$ and $D_{s2} \pm \alpha$" ?
$D_{s4}$: Within "average value of $D_{s1}$, $D_{s2}$ and $D_{s3} \pm \alpha$" ?
$D_{s5}$: Within "average value of $D_{s1}$, $D_{s2}$, $D_{s3}$ and $D_{s4} \pm \alpha$" ?

Referring to FIG. 28, it can be found that change for $D_{s5}$ is relatively smaller than those for $D_{s1}$ to $D_{s4}$ since a slight saturation is observed in step 6.

According to the determination above, only "$D_{s5}$" is not appropriate and therefore, it can be determined that circuit saturation starts at this point.

According to the method of determination as explained above, the threshold value used as the basis is the average of amounts of change of steps having signal output levels lower than the signal output level of the noted step. The reason for this is that if the threshold value is uniformly set with the system fixed, scatter in CCD sensitivity and the circuit gain generates any difference in the amount of signal change between steps, resulting in inaccurate determination in some cases.

The step having a signal output smaller than that of the noted step is used as the basis since patches of several steps at the black side with greater density are set to the density that can be read sufficiently unless an expected trouble occurs in the circuit system.

Figure 29:
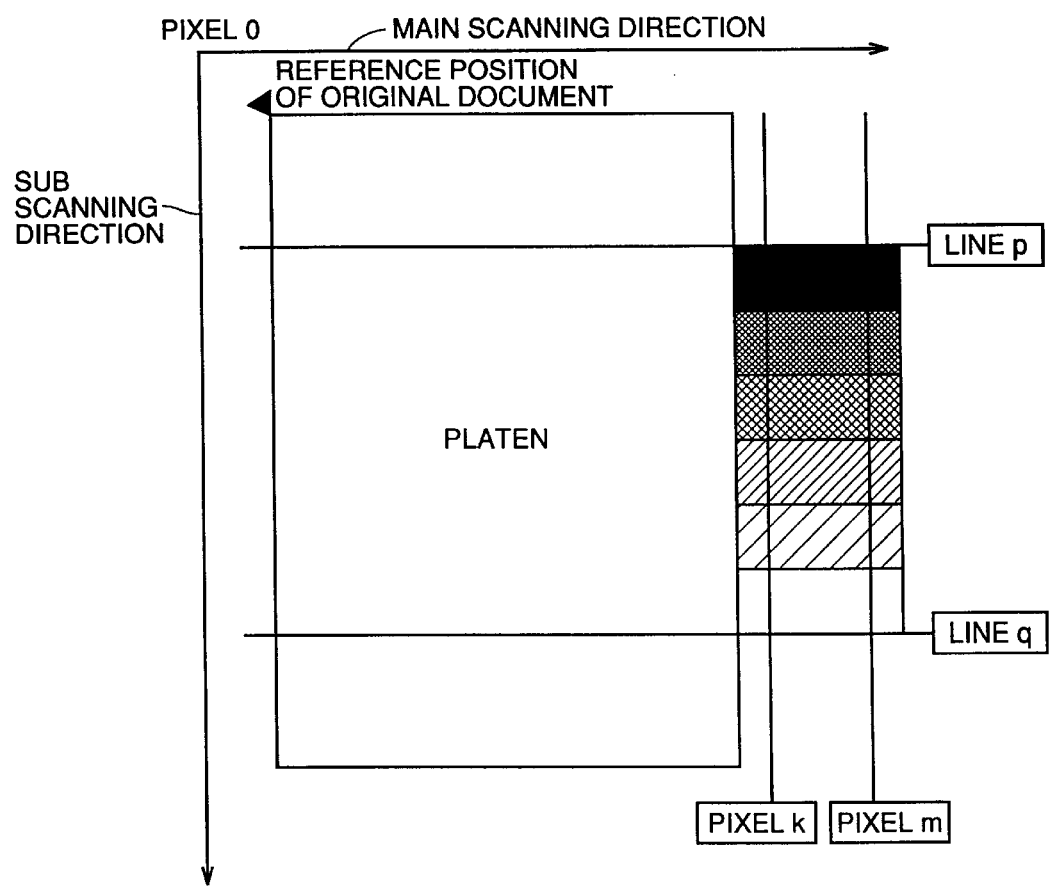
FIG. 29 illustrates a positional relation in reading the gray chart used for measurement according to the present invention.

FIG. 29 illustrates a positional relation when the gray chart for measurement according to the present invention is read.

Referring to FIG. 29, the gray chart for measurement is arranged to have gray steps in the sub scanning direction relative to the platen reading section, and located on the opposite side of the reference position of an original.

Positions of the gray scale to be read in the main scanning direction correspond to "pixel k" to "pixel m", and positions to be read in the sub scanning direction correspond to "line p" to "line q."

Figure 30:
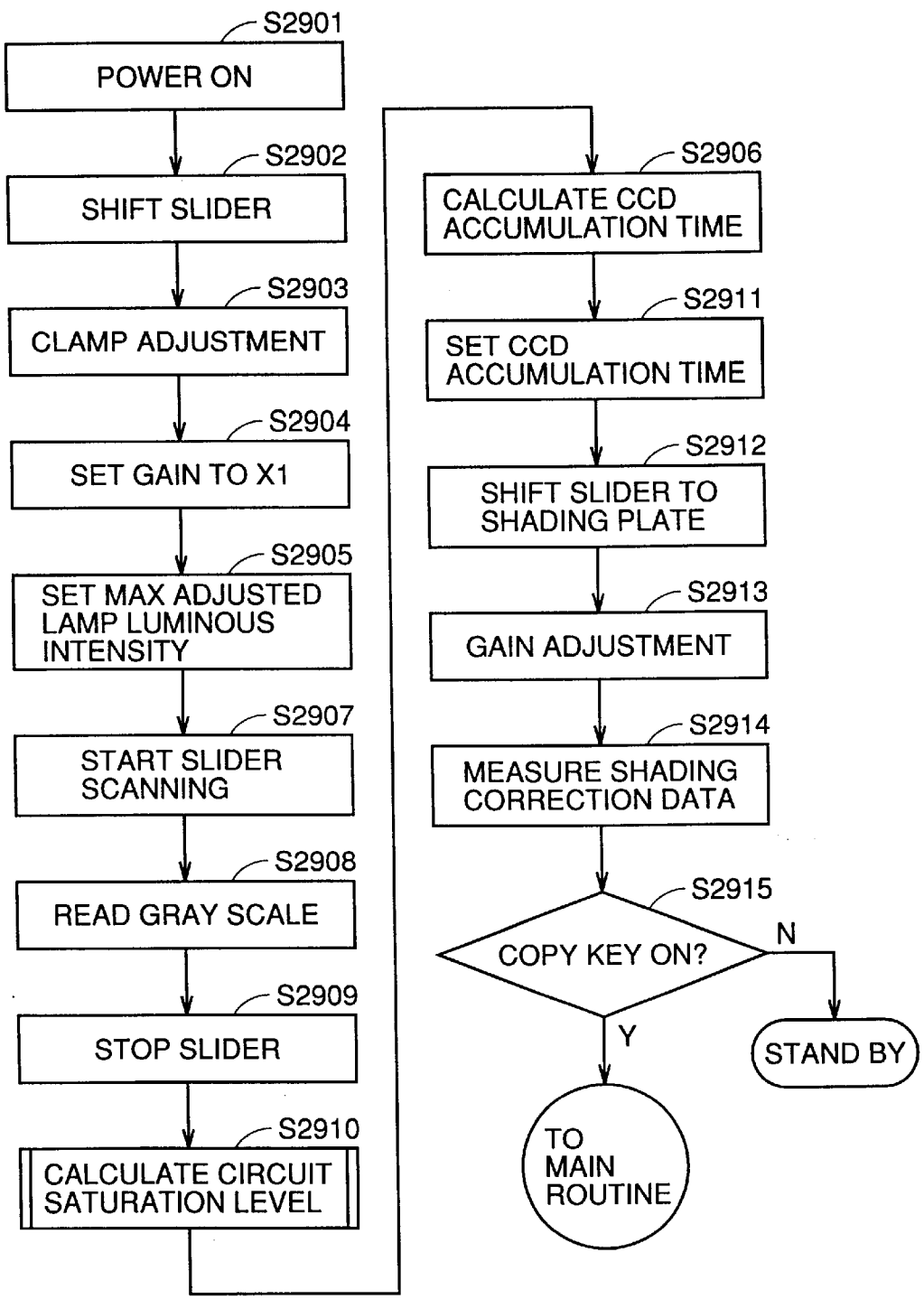

FIG. 30 is a flow chart illustrating another example of an operation sequence followed when the power source is turned on.

While FIG. 23 shows a flow followed for controlling the amount of light directed to an original document according to the circuit saturation level, FIG. 30 shows a flow chart of the second embodiment in which CCD accumulation time is controlled according to the circuit saturation level.

Referring to FIG. 30, when the power switch is turned on (S2901), a prescribed initial operation is executed. When the control sequence becomes stable, a slider is moved to the position of a shading plate (S2902). Clamp adjustment is next performed for black level compensation of the reading circuit system (S2903).

The circuit gain is set to ×1 (S2904) to avoid unnecessary circuit saturation. When the preliminary process is completed, the adjusted lamp luminous intensity is set to the maximum (max) value, and the lamp is turned on (S2905).

Waiting for a certain time until the amount of light of the lamp becomes stable, the slider starts scanning (S2907), and reads the gray scale (S2908). When the gray scale is scanned to a position to be stopped, the slider is stopped (S2909).

From the read gray scale data, the saturation level of the reading circuit system is calculated (S2910), CCD accumulation time is calculated from the saturation level (S2906), and the calculated value is set at the timing generator (S2911).

The slider is moved to the position of the shading plate (S2912), gain adjustment is applied with an optimum amount of light of the lamp considering the circuit saturation level (S2913), and data of shading compensation is measured in order to correct lamp orientation and the error in CCD image sensitivity (S2914).

Whether the copy key is pressed or not is determined (S2915).

If the copy key is pressed, the main routine illustrated in FIG. 2 is executed. If the copy key is not pressed, the standby state is set.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:
   illumination means for directing light toward an original document;
   a transducer unit for converting said light directed toward said original document and reflected therefrom to an electric signal; and
   light amount control means for controlling an amount of light from said illumination means according to a saturation characteristic and a frequency characteristic of said transducer unit.

2. The image reading apparatus according to claim 1, further comprising detection means for detecting the saturation and frequency characteristics of said transducer unit.

3. The image reading apparatus according to claim 2, wherein said detection means detects the saturation and frequency characteristics of said transducer unit by reading a pattern.

4. The image reading apparatus according to claim 3, wherein said pattern has a change in density in a sub scanning direction.

5. The image reading apparatus according to claim 4, wherein said change in density in said sub scanning direction gradually decrease.

6. The image reading apparatus according to claim 5, wherein said pattern has a change in density in a main scanning direction.

7. The image reading apparatus according to claim 6, wherein
   two degrees of density are alternately arranged to constitute said change in density in said main scanning direction.

8. An image reading apparatus in accordance with claim 1, further comprising:
   a platen placed at a position away from said illumination means at a predetermined distance, said illumination means being capable of illuminating said original document placed on said platen.

9. An image reading apparatus comprising:
   illumination means for directing light toward an original document;
   a transducer unit for converting said light directed toward said original document and reflected therefrom to an electric signal;
   change means for changing a time for accumulating an amount of light at said transducer unit; and
   accumulation time control means for controlling a time for accumulating an amount of light at said change unit according to a saturation characteristic and a frequency characteristic of said transducer unit.

10. The image reading apparatus according to claim 9, further comprising detection means for detecting a saturation characteristic and a frequency characteristic of said transducer unit.

11. The image reading apparatus according to claim 10, wherein said detection means detects the saturation and frequency characteristics of said transducer unit by reading a pattern.

12. The image reading apparatus according to claim 11, wherein said pattern has a change in density in a sub scanning direction.

13. The image reading apparatus according to claim 12, wherein said change in density in said sub scanning direction gradually decrease.

14. The image reading apparatus according to claim 13, wherein said pattern has a change in density in a main scanning direction.

15. The image reading apparatus according to claim 14, wherein
   two degrees of density are alternately arranged to constitute said change in density in said main scanning direction.

16. An image reading apparatus in accordance with claim 9, further comprising:
   a platen positioned away from said illumination means at a predetermined distance, said illumination means being capable of illuminating an original placed on said platen.

17. An image reading apparatus comprising:
   an illuminator to produce light and cast such light toward an original document;
   a transducer unit for converting light reflected from such an original document to an electric signal; and
   a controller to control an amount of light produced by the illuminator in accordance with a saturation characteristic and an operational slew rate of at least the transducer unit.

18. An image reading apparatus in accordance with claim 17, further comprising:

a platen positioned away from said illuminator at a predetermined distance, said illuminator being capable of illuminating an original document placed on said platen.

19. A method for controlling an output light quantity of an illuminator for an image reading apparatus comprising the steps of:

illuminating a prescribed pattern with illumination, at an initial intensity, whereas light reflected from the pattern is received by a transducer unit having at least a photoelectric device to convert detected light into corresponding electrical signals;

calculating a transducer unit saturation level based on the detected light and an operational slew rate of at least the transducer unit; and depending upon a calculated saturation level, modifying an operational intensity of the illuminator for purposes of illuminating an original.

* * * * *

UNITED STATES PATENT AND TRADEMARK OFFICE
CERTIFICATE OF CORRECTION

PATENT NO. : 6,788,831 B1
DATED : September 7, 2004
INVENTOR(S) : Takayuki Nabeshima It is certified that error appears in the above-identified patent and that said Letters Patent is hereby corrected as shown below:

Column 1,
Line 29, delete "out", insert -- output --.
Line 34, delete "unnecessary", insert -- an unnecessary --.

Column 11,
Line 47, delete "gray/scale", insert -- gray scale --.
Line 58, delete "AD", insert -- A/D --.

Column 19,
Line 67, delete "decrease", insert -- decreases --.

Column 20,
Line 41, delete "decrease", insert -- decreases --.

Signed and Sealed this

Sixth Day of September, 2005

JON W. DUDAS
*Director of the United States Patent and Trademark Office*